(12) United States Patent
Akutsu et al.

(10) Patent No.: US 10,471,854 B2
(45) Date of Patent: Nov. 12, 2019

(54) VEHICULAR SEAT

(71) Applicant: TS TECH CO., LTD., Asaka-shi, Saitama (JP)

(72) Inventors: Takeshi Akutsu, Tochigi (JP); Daisuke Kitagawa, Tochigi (JP); Taro Murayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 23 days.

(21) Appl. No.: 15/878,042

(22) Filed: Jan. 23, 2018

(65) Prior Publication Data

US 2018/0186252 A1 Jul. 5, 2018

Related U.S. Application Data

(62) Division of application No. 14/897,760, filed as application No. PCT/JP2014/065611 on Jun. 12, 2014, now Pat. No. 9,884,571.

(30) Foreign Application Priority Data

Jun. 14, 2013 (JP) .................................. 2013-125559
Mar. 13, 2014 (JP) .................................. 2014-049935

(51) Int. Cl.
*B60N 2/12* (2006.01)
*B60N 2/30* (2006.01)
(Continued)

(52) U.S. Cl.
CPC .................. *B60N 2/12* (2013.01); *B60N 2/06* (2013.01); *B60N 2/3013* (2013.01);
(Continued)

(58) Field of Classification Search
CPC . B60N 2/02; B60N 2/04; B60N 2/206; B60N 2/30; B60N 2/3004; B60N 2/3009;
(Continued)

(56) References Cited

U.S. PATENT DOCUMENTS 6,655,724 B1 12/2003 Yoshino et al.
2004/0032155 A1 2/2004 Yamada et al.
(Continued)

FOREIGN PATENT DOCUMENTS

DE 31 02 844 A1 8/1982
EP 1407923 A1 * 4/2004 ........... B60N 2/3013
(Continued)

OTHER PUBLICATIONS

Office Action issued in related application CN 201480031908.7, dated Feb. 3, 2017, with partial English language translation, 5 pages.

*Primary Examiner* — Jason S Daniels
(74) *Attorney, Agent, or Firm* — Drinker Biddle & Reath LLP

(57) ABSTRACT

A vehicle seat having a seat back and seat cushion connected thereto, the seat back and seat cushion being retractable to a retraction floor disposed lower than a vehicle body floor, is described. The vehicle seat includes: a support base connected to the body floor, disposed below the seat cushion, and pivotally connected to a lower end of the seat back; a detachable leg having an upper end attached to the seat cushion and a lower end connectable to the support base; a leg retaining member attached to the support base and configured to detachably retain the lower end of the detachable leg; and a base cover that covers the support base. The leg retaining member is disposed at a rear side of a front end of a portion of the base cover in a front to back direction that is configured to cover the support base from above.

18 Claims, 14 Drawing Sheets

(51) Int. Cl.
*B60N 2/06* (2006.01)
*B60N 2/42* (2006.01)
*B60N 2/70* (2006.01)

(52) U.S. Cl.
CPC ......... *B60N 2/3047* (2013.01); *B60N 2/3065* (2013.01); *B60N 2/43* (2013.01); *B60N 2/70* (2013.01)

(58) Field of Classification Search
CPC .. B60N 2/3013; B60N 2/3047; B60N 2/3065; B60N 2/3072; B60N 2/3075
USPC ................................ 296/65.05, 65.09, 65.16
See application file for complete search history.

(56) References Cited

U.S. PATENT DOCUMENTS

| | | |
|---|---|---|
| 2004/0100117 A1 | 5/2004 | Rhodes et al. |
| 2004/0212237 A1 | 10/2004 | Epaud et al. |
| 2016/0046210 A1 | 2/2016 | Nakamura et al. |
| 2016/0052425 A1 | 2/2016 | Akutsu et al. |

FOREIGN PATENT DOCUMENTS

| | | |
|---|---|---|
| EP | 2 108 541 A1 | 10/2009 |
| JP | 2008-030657 A | 2/2008 |
| JP | 2009-067309 A | 4/2009 |
| JP | 2012-201208 A | 10/2012 |
| WO | 02/100678 A1 | 12/2002 |
| WO | 2009/104586 A1 | 8/2009 |

\* cited by examiner

<LEG MOVEMENT RESTRICTION PART>

<LEG MOVEMENT RESTRICTION PART>

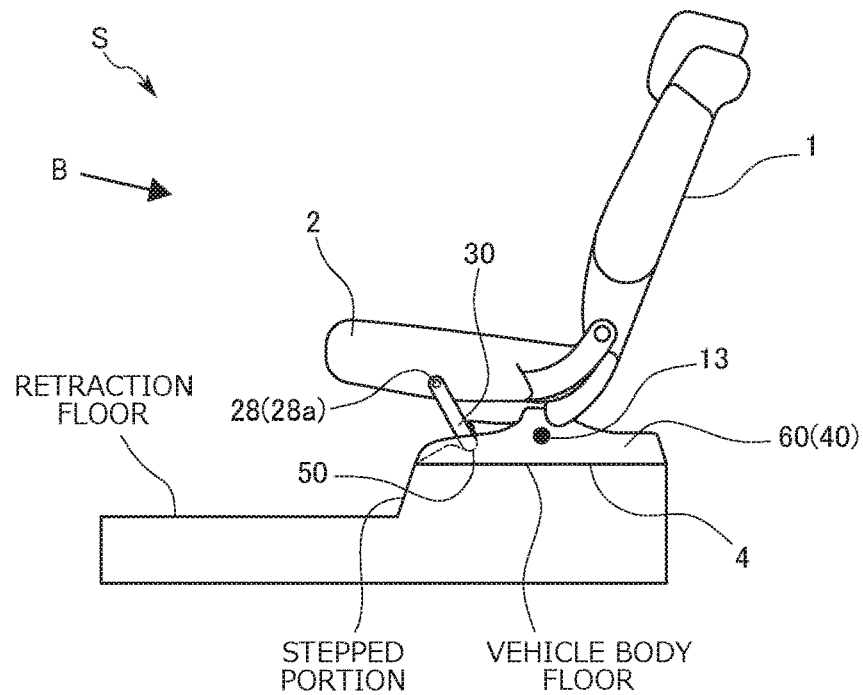
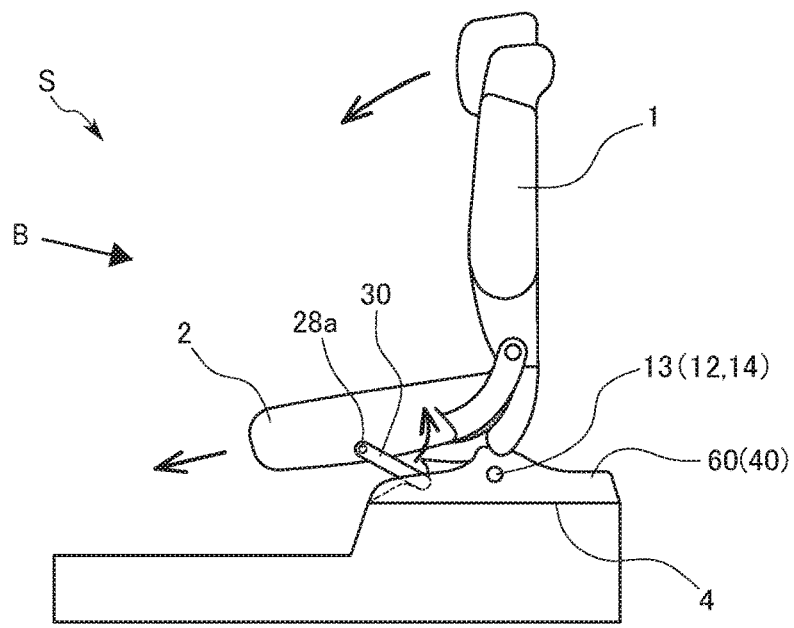

<SEAT TIP-UP OPERATION>

<SEAT TIP-UP OPERATION>

<SEAT RETURNING OPERATION>

<SEAT RETURNING OPERATION>

<SEAT RETURNING OPERATION (ONE-MOTION OPERATION)>

<SEAT RETURNING OPERATION (ONE-MOTION OPERATION)>

VEHICULAR SEAT

CROSS REFERENCE TO RELATED APPLICATIONS

This application is a divisional application of U.S. patent application Ser. No. 14/897,760, filed Dec. 11, 2015, now U.S. Pat. No. 9,884,571, which is the National Stage Entry application of PCT Application No. PCT/JP2014/065611, filed Jun. 12, 2014, which claims the priority benefit of Japanese Patent Application No. 2013-125559, filed Jun. 14, 2013, and Japanese Patent Application No. 2014-049935, filed Mar. 13, 2014, the contents of each of which are incorporated herein by reference in their entireties.

BACKGROUND

The present disclosure relates to a vehicle seat, and particularly to a vehicle seat having a seat back and a seat cushion connected to the seat back, the seat back and the seat cushion being retractable to a retraction floor formed in a position lower than a vehicle body floor.

Conventionally, vehicle seats have been known in which a seat body having a seat cushion and a seat back can be retracted in a retraction floor formed in a position lower than a vehicle body floor. Among those vehicle seats, there is a vehicle rear seat which is configured so that a seat body is tilted forward to be retracted in a retraction floor arranged at a front side of the seat, for example, see Japanese Patent Document No. 2009-067309A (referred to herein as "the '309 Document").

A vehicle seat described in the '309 Document has a retraction structure including: an attachment shaft, which is attached to a vehicle body floor to support a seat back so that the seat back can pivot, and a leg member, which has an upper end supporting a front portion of a seat cushion and a lower end pivotally retained by a retaining groove fixed on a retraction floor. At the time of a retracting operation of a seat body, the seat back pivots relative to the vehicle body floor to move the seat cushion to the retraction floor and the leg member pivots about the retaining groove in conjunction with the seat back; thereby, the seat body is configured to be retracted in the retraction floor. In addition, the leg member is detached from the retaining groove; thereafter, the vehicle seat can change from a "seatable" state where an occupant can be seated to a "tip-up" state where the seat cushion is tipped up.

However, the seat that can retract the seat body in the retraction floor as in the '309 Document has a more complicated retraction structure in order to retract the seat body in a such a way that components such as the leg member for supporting the seat back so that the seat back can pivot, the retaining groove, and the like are attached not only to a surface of the vehicle body floor at which the seat body is arranged but also to a surface of the retraction floor. Therefore, a vehicle seat which can be retracted in a retraction floor utilizing a more simple structure is desirable. In addition, a vehicle seat which can secure a large retraction space is desirable.

Further, in the seat as described in the '309 Document, the leg member that supports the seat cushion is connected between the seat cushion and the retraction floor, therefore being an elongated member. Thus, in the event of change the seat body between the seatable state and the tip-up state, the leg member is detached from the retaining groove. However, an entire length of the leg member is long and therefore a pivotable range thereof in a front to back direction increases. As a result, an operation to fit the leg member into the retaining groove is difficult. Therefore, a vehicle seat which more easily changes from the seatable state is desirable.

Furthermore, in the seat as described in the '309 Document, for the purpose of protection from impacts or the like from outside, in general, a cover member of resin for covering from above the attachment shaft, the retaining groove, and the like that configure the retraction structure is attached. However, facilitation of a seat state changing operation by utilizing this cover member has not been considered. Therefore, a vehicle seat which more easily changes from a seatable state by utilizing a cover member for covering components of a retraction structure from above is desirable.

SUMMARY

The present disclosure is made in view of the above-mentioned problems, and the present disclosure describes various embodiments of a vehicle seat which is retractable to a retraction floor by a generally simple structure. Further, the present disclosure describes embodiments of a vehicle seat which can secure a large retraction space without the arrangement of components of a retraction structure on a surface of a retraction floor. Furthermore, the present disclosure describes embodiments of a vehicle seat which more easily changes from a seatable state to another state.

Various embodiments of the present disclosure, discussed below, have been made in view of the above-described problems and provide a vehicle seat having a seat back and a seat cushion connected to the seat back, the seat back and the seat cushion being retractable to a retraction floor formed in a position lower than a vehicle body floor, the vehicle seat including: a support base connected to the vehicle body floor, disposed below the seat cushion, and pivotally connected to a lower end of the seat back so that the lower end of the seat back is pivotable; a detachable leg having an upper end attached to the seat cushion and a lower end connectable to the support base; a leg retaining member attached to the support base and configured to retain the lower end of the detachable leg so that the lower end of the detachable leg is detachable; and a base cover that covers the support base from above the support base, where the leg retaining member is disposed at a rear side of a front end of a portion of the base cover in a front to back direction of the seat, the portion of the base cover configured to cover the support base from above the support base.

According to the above-mentioned configuration, the vehicle seat having a seat back and a seat cushion connected to the seat back, the seat back and the seat cushion being retractable to a retraction floor formed in a position lower than a vehicle body floor, can be implemented with a more simple structure without any components disposed on the retraction floor, the simple structure including: the support base disposed on the vehicle body floor to support the seat back so that the seat back is pivotable; the detachable leg supporting the seat cushion; the leg retaining member attached to the support base and retaining the lower end of the detachable leg so that the lower end of the detachable leg is detachable; and the base cover covering the support base from above. In particular, the leg retaining member retaining the detachable leg is disposed at the rear side of the front end of the portion of the base cover in the front to back direction of the seat, the portion covering the support base from above the support base. Accordingly, the detachable leg and the leg retaining member are disposed so as not to protrude from the support base and the base cover toward the front side of the seat. Therefore, a larger space can be secured at the front side of the seat. In addition, all of the support base, the detachable leg, the leg retaining member, and the base cover that configure components of a retraction structure are disposed on the vehicle body floor; therefore, a large retraction space can be secured in the retraction floor. Moreover, the leg retaining member is disposed not on the retraction floor as in the prior art but on the vehicle body floor; therefore, an entire length of the detachable leg can be reduced. The shorter the entire length of the detachable leg is, the shorter a pivotable range of the detachable leg in the front to back direction is. Thus, the detachable leg is easily retained by the leg retaining member. Consequently, a vehicle seat that more easily changes from a seatable state is obtained.

In some embodiments, it is preferable that the seat back is pivotable relative to the support base to move the seat cushion to the retraction floor, that the detachable leg pivots relative to the seat cushion based on a movement of the seat cushion to be detachable from the leg retaining member, that the base cover includes a leg guide portion which guides the detachable leg so that the detachable leg detached from the leg retaining member is retracted to the seat cushion, and that the leg guide portion is disposed, relative to the detachable leg, in a direction of the movement of the seat cushion. According to the above-mentioned configuration, the leg guide portion of the base cover guides the detachable leg so that the detachable leg is retracted to the seat cushion; therefore, the seat is more easily changed from the seatable state to a retracted state. In addition, the detachable leg is retracted to the seat cushion; therefore, the seat body is compactly retracted in the retraction floor.

In some embodiments, preferably, the upper end of the detachable leg attached to the seat cushion is disposed at a front side of the lower end of the detachable leg connected to the support base in the front to back direction of the seat. According to the above-mentioned configuration, the upper end of the detachable leg is disposed at the front side of the lower end of the detachable leg. Thus, the detachable leg is disposed to be inclined upward toward the front side of the seat. Consequently, the detachable leg is disposed to be easily pivotally retracted to the seat cushion. In addition, at a lower side of the seat cushion, the leg retaining member retaining the lower end of the detachable leg is disposed relatively rearward in the front to back direction of the seat. Therefore, a space can be secured at the front side of the leg retaining member and the detachable leg in the front to back direction of the seat and an occupant can freely bend and stretch his/her legs. Moreover, the seat can be reduced in size in an up to down direction.

In some embodiments, preferably, the leg guide portion is formed in a protruding manner upward from an upper surface of the base cover and is integrally formed with the base cover. According to the above-mentioned configuration, the base cover and the guide portion are formed as a one-piece member; therefore, the number of components is reduced.

In some embodiments, preferably, the leg guide portion is jutted from an outer surface of the base cover in the direction of the movement of the seat cushion. According to the above-mentioned configuration, the leg guide portion of the base cover is more easily brought into contact with the detachable leg in the direction of the movement of the seat cushion, thereby more easily guiding the detachable leg.

In some embodiments, it is preferable that the retraction floor is disposed at a front side of the vehicle body floor in the front to back direction of the seat and that the base cover has a leg movement restriction portion which is disposed in a rear side of the leg retaining member in the front to back direction of the seat and which restricts the detachable leg from moving rearward from the leg retaining member in the front to back direction of the seat. According to the above-mentioned configuration, the leg movement restriction portion of the base cover restricts a movement of the detachable leg. Therefore, for example, when the seat is returned from the retracted state to the seatable state, the detachable leg is guided to be more easily retained by the leg retaining member.

In some embodiments, preferably, the leg movement restriction portion is integrally formed with the base cover. According to the above-mentioned configuration, the base cover and the leg movement restriction portion are formed as a one-piece member; therefore, the number of components can be reduced.

In some embodiments, preferably, the leg movement restriction portion includes a protruding portion that protrudes upward from an upper surface of the base cover. According to the above-mentioned configuration, the leg movement restriction portion of the base cover more easily restricts the movement of the detachable leg in the up to down direction. Therefore, for example, when the seat is returned from the retracted state to the seatable state, the detachable leg is guided to be more easily retained by the leg retaining member.

In some embodiments, preferably, the protruding portion of the leg movement restriction portion is jutted forward in the front to back direction of the seat. According to the above-mentioned configuration, the leg movement restriction portion more easily restricts the movement of the detachable leg in the front to back direction of the seat; therefore, the detachable leg is guided to be more easily retained by the leg retaining member.

In some embodiments, preferably, the leg movement restriction portion is positioned to overlap the leg guide portion in a seat width direction. According to the above-mentioned configuration, the leg movement restriction portion and the leg guide portion are compactly disposed.

In some embodiments, preferably, the vehicle seat includes: a seat body having the seat back and the seat cushion; and a seat pivot shaft attached on the support base and connected at a first end of the seat body in the front to back direction of the seat so that the seat body is pivotable, wherein the upper end of the detachable leg is attached to a second end of the seat body in the front to back direction of the seat, wherein a leg movement restriction portion is configured to restrict a movement path of the detachable leg when detached from the leg retaining member based on a movement of the seat body and is disposed at the base cover, the leg movement restriction portion being disposed, relative to the leg retaining member, in a direction opposite to a direction in which the detachable leg moves from a position in which the detachable leg is retained by the leg retaining member, and wherein the leg movement restriction portion includes a contact portion, contactable with the detachable leg, and a protruding portion, disposed above the contact portion, wherein the protruding portion protrudes toward the detachable leg relative to an imaginary plane which is perpendicular to a direction in which the detachable leg is brought into contact with the contact portion and passes through the contact portion. According to the above-mentioned configuration, for example, when the seat body is returned from the retracted state to the seatable state, the detachable leg moving along with the seat body is restricted by the leg movement restriction portion, thereby being more easily retained by the leg retaining member while not passing over the leg retaining member. In addition, the protruding portion disposed at the leg movement restriction portion protrudes toward the detachable leg relative to the imaginary plane that is the plane being perpendicular to the direction in which the detachable leg is brought into contact with the contact portion and passing through the contact portion. Therefore, the leg movement restriction portion can restrict the movement of the detachable leg so that the detachable leg moves toward the leg retaining member. Consequently, the detachable leg is more easily retained by the leg retaining member.

In some embodiments, it is preferable that the retraction floor is disposed in the front side of the vehicle body floor in the front to back direction of the seat, that the seat pivot shaft is connected to a rear end of the seat body in the front to back direction of the seat and the upper end of the detachable leg is attached to a front end of the seat body in the front to back direction of the seat, that the leg movement restriction portion is disposed at the rear side of the leg retaining member in the front to back direction of the seat, and that the protruding portion protrudes forward relative to the imaginary plane in the front to back direction of the seat. According to the above-mentioned configuration, when the seat body is returned from the retracted state to the seatable state, that is, when the detachable leg is fitted again into the leg retaining member, the leg movement restriction portion restricts the movement of the detachable leg so that the detachable leg moves toward the leg retaining member. Therefore, a seat state changing operation is successfully performed.

In some embodiments, preferably, a contact surface of the leg movement restriction portion with which the detachable leg is brought into contact is inclined toward the detachable leg relative to the imaginary plane. In addition, preferably, the contact portion is disposed, relative to a plane which is defined by the leg retaining member and a protruding tip end of the protruding portion, in a direction opposite to a direction in which the detachable leg moves from a position in which the detachable leg is retained by the leg retaining member. According to the above-mentioned configuration, the leg movement restriction portion is shaped to more easily restrict the movement of the detachable leg so that the detachable leg moves toward the leg retaining member; therefore, the detachable leg is more easily retained by the leg retaining member.

In some embodiments, preferably, the leg movement restriction portion and a leg retraction recessed portion are formed on an upper surface of the base cover, the leg retraction recessed portion being disposed closer to the leg retaining member than the leg movement restriction portion in the front to back direction of the seat and configured to be recessed toward the leg retaining member, the leg retraction recessed portion configured to guide the detachable leg to be retained by the leg retaining member. According to the above-mentioned configuration, the leg movement restriction portion and the leg retraction recessed portion that are formed on the upper surface of the base cover guide the detachable leg to move toward the leg retaining member; therefore, the detachable leg is more easily retained by the leg retaining member.

According to an embodiment, the vehicle seat where the seat back and the seat cushion that form the seat body can be retracted in the retraction floor and can be implemented by a simple structure without any components disposed on the retraction floor. In particular, the detachable leg and the leg retaining member are disposed so as not to protrude forward from the support base and the base cover toward the front side of the seat. Therefore, a large space can be secured at the front side of the seat. Further, components of the retraction structure are all disposed on the vehicle body floor; therefore, a large retraction space can be secured in the retraction floor. Furthermore, the leg retaining member is disposed not on the retraction floor but on the vehicle body floor; therefore, an entire length of the detachable leg can be reduced. The shorter the entire length of the detachable leg is, the shorter a pivotable range of the detachable leg in the front to back direction is. Thus, the detachable leg is more easily retained by the leg retaining member. Consequently, the vehicle seat more easily changes from the seatable state.

According to an embodiment, the leg guide portion of the base cover guides the detachable leg so that the detachable leg is retracted to the seat cushion; therefore, the seat is more easily changed from the seatable state to the retracted state. In addition, the detachable leg is retracted to the seat cushion; therefore, the seat body is compactly retracted in the retraction floor. According to an embodiment, the detachable leg is disposed to be more easily pivotally retracted to the seat cushion. In addition, a space can be secured at the front side of the leg retaining member and the detachable leg in the front to back direction of the seat and an occupant can freely bend and stretch his/her legs. Moreover, the seat can be reduced in size in the up to down direction.

According to an embodiment, the leg guide portion and the leg movement restriction portion are integrally formed with the base cover to be a one-piece member; therefore, the number of components can be reduced. Further, the leg movement restriction portion and the leg guide portion are compactly disposed. According to an embodiment, the detachable leg is guided by the leg movement restriction portion, thereby being more easily guided by the leg retaining member.

According to an embodiment, when the seat body is returned from the retracted state to the seatable state, the detachable leg moves along with the seat body and is restricted by the leg movement restriction portion, thereby being more easily retained by the leg retaining member while not passing over the leg retaining member. In addition, by means of the protruding portion disposed at the leg movement restriction portion, the leg movement restriction portion can restrict the movement of the detachable leg so that the detachable leg moves toward the leg retaining member; therefore, the detachable leg is more easily retained by the leg retaining member. According to an embodiment, when the seat body is returned from the retracted state to the seatable state, that is, when detachable leg is fitted again into the leg retaining member, the seat state changing operation is successfully performed by the leg movement restriction portion.

BRIEF DESCRIPTION OF THE DRAWINGS

Various embodiments of the invention are illustrated in the drawings, in which:

FIG. 8A and FIG. 8B are side views of the vehicle seat, illustrating a movement of the vehicle seat from a seatable state to a retracted state;

DETAILED DESCRIPTION

Various embodiments described herein relate to a vehicle seat which is configured to retract a seat body in a retraction floor, the vehicle seat including a support base which is attached to a vehicle body floor to support a seat back of the vehicle seat. The seat back is pivotable about a seat pivot shaft, which is attached to the support base, to move a seat cushion of the vehicle seat to a retraction floor. A leg retaining member, which detachably retains a lower end of the detachable leg supporting the seat cushion, is attached to the support base. The vehicle seat is configured so that a shape of a base cover which covers the support base is utilized to facilitate a state changing operation of the seat body. In addition, a side at which an occupant is seated with respect to the seat back of the vehicle seat is a front side of the seat.

In some embodiments, a vehicle seat S is, for example, a rear seat corresponding to a back seat of a vehicle. Further, the vehicle seat S can be utilized as a middle seat which is at a second row of a vehicle equipped with a three-row seat in a front to back direction of the vehicle.

Figure 1:
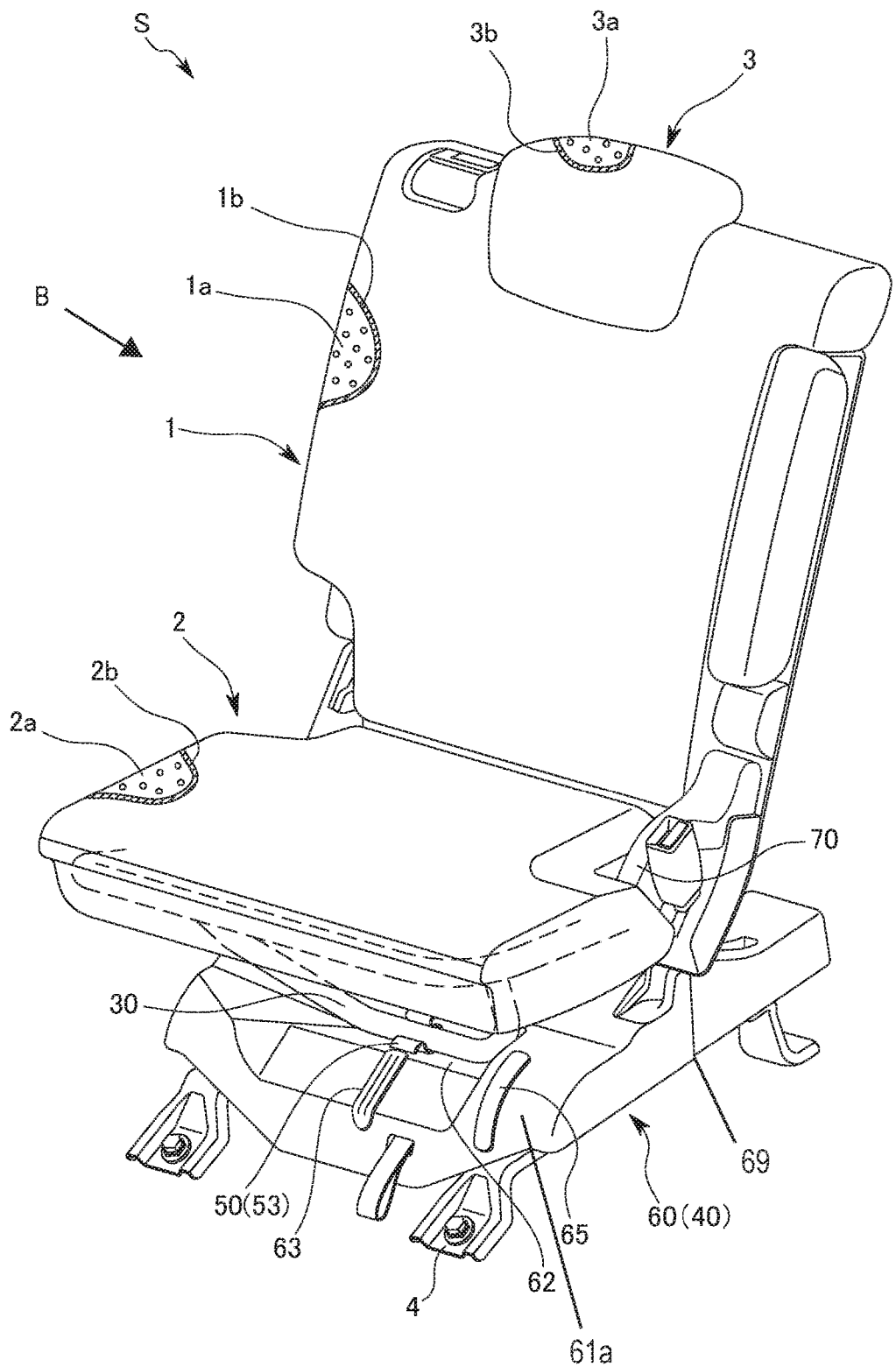
FIG. 1 is a perspective view of a vehicle seat, according to an embodiment.

As shown in FIG. 1, the vehicle seat S generally includes: a seat body B equipped with a seat back 1, a seat cushion 2, and a headrest 3; right and left rail devices 4, each of the right and left devices 4 attached on a vehicle body floor of a vehicle to support the seat body B so that the seat body B is movable in a front to back direction; a support base 40 attached to the right and left rail devices 4; a detachable leg 30 attached between the seat cushion 2 and the support base 40 to support the seat cushion 2 from below the seat cushion 2; and a leg retaining member 50 attached to the support base 40 to support a lower end of the detachable leg 30 so that the lower end is detachable. Further, as shown in FIG. 1, the vehicle seat S has a base cover 60 which covers the support base 40 from above the support base 40, cushion covers 70 that partially cover the seat cushion 2 from an outer side of the seat cushion 2 in a right to left direction, and a leg movement restriction portion configured to restrict a movement path of the detachable leg 30 when detached from the leg retaining member 50 based on a movement of the seat body B. Furthermore, as show in FIG. 2, the vehicle seat S has a reclining device 13 which connects the seat back 1 so that the seat back 1 is pivotable relative to the support base 40 about a seat pivot shaft 12, a cushion pivoting device 25 which connects the seat cushion 2 so that the seat cushion 2 is pivotable relative to the seat back 1, and a leg pivoting device 28 which connects the detachable leg 30 so that the detachable leg 30 is pivotable relative to the seat cushion 2. As shown in FIG. 8, a recessed retraction floor formed in a position lower than the vehicle body floor is disposed at a front side of the vehicle seat S.

The vehicle seat S is a seat which can be disposed in three types of states: a "seatable" state where an occupant can be seated; a retracted state where the seat body B is retracted in the retraction floor; and a "tip-up" state where the seat body B is tipped up. More specifically, when the vehicle seat S is in the seatable state shown in FIG. 8A, an operating lever (not shown) is operable by an occupant (e.g., the occupant may pull the operating lever). The seat body B is configured to, in response to operation of the operating lever, tilt forward to be folded and the vehicle seat S changes to the retracted state shown in FIG. 9C, where the seat body B is retracted in the retraction floor. Further, from the retracted state, the seat body B is configured to be tilted up manually by the occupant to change to the tip-up state shown in FIG. 10B. Furthermore, when the seat body B is in the tip-up state, the detachable leg 30 is operable as an operating lever that may be pulled by the occupant; the seat cushion 2 is configured to, in response to operation of the detachable leg 30 as an operating lever, pivot in a downward direction relative to the seat back 1 and the seat body B is configured to return to the seatable state shown in FIG. 11B.

Figure 2:
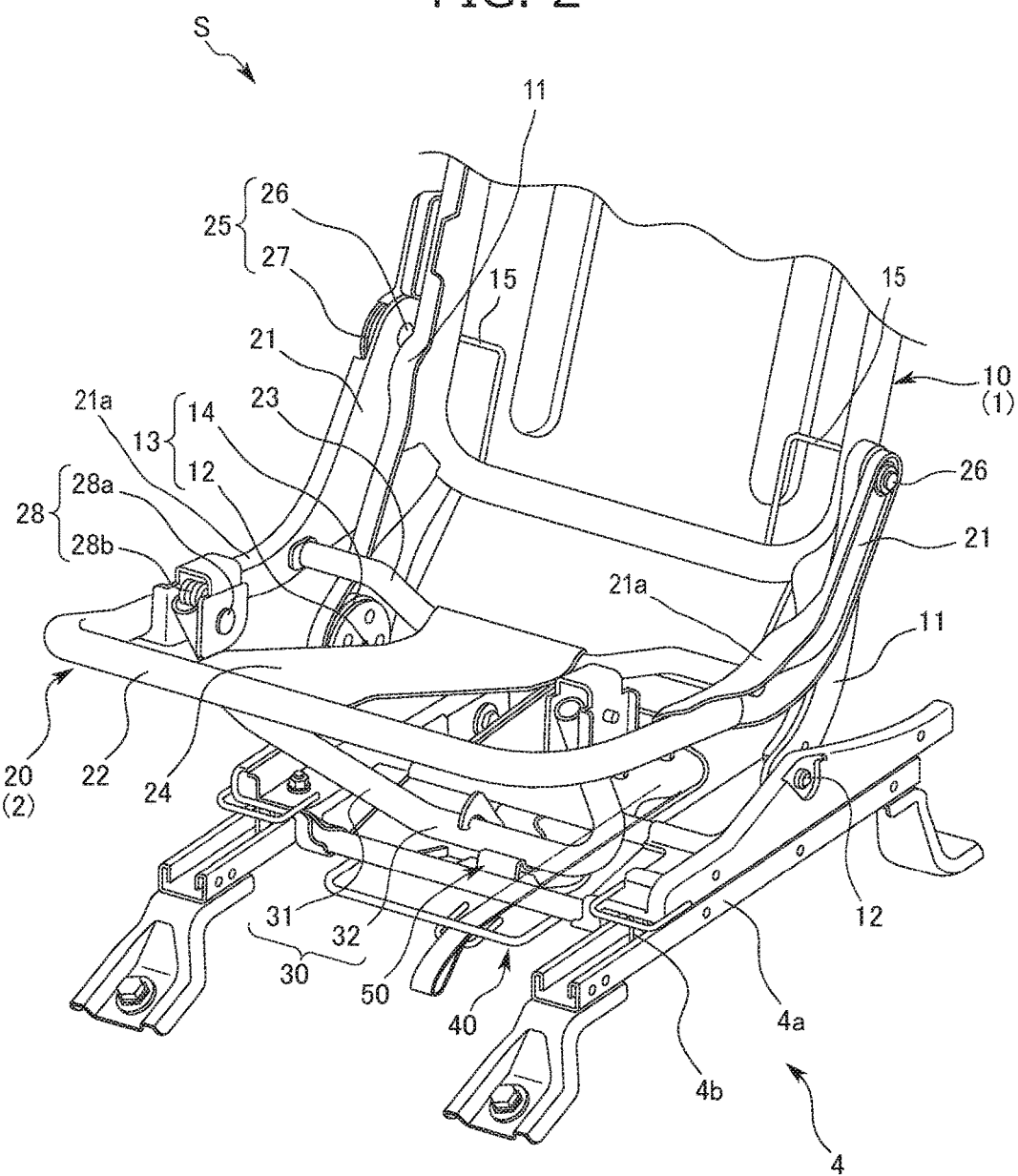
FIG. 2 is a partial perspective view of a seat frame that serves as a framework of the vehicle seat.

As shown in FIG. 1, the seat back 1 is a backrest which supports the back of an occupant from behind, and is configured so that a cushion pad 1a mounted on a back frame 10 shown in FIG. 2 and serves as a frame is covered by a surface material 1b. The seat cushion 2 is a seating portion which supports an occupant from below, and is configured so that a cushion pad 2a mounted on a cushion frame 20 shown in FIG. 2 and serves as a frame is covered from above by a surface material 2b. The headrest 3 is a head portion which supports the head of an occupant from behind, and is configured so that a cushion pad 3a mounted on a pillar (not shown) serves as a core material is covered by a surface material 3b.

Figure 3:
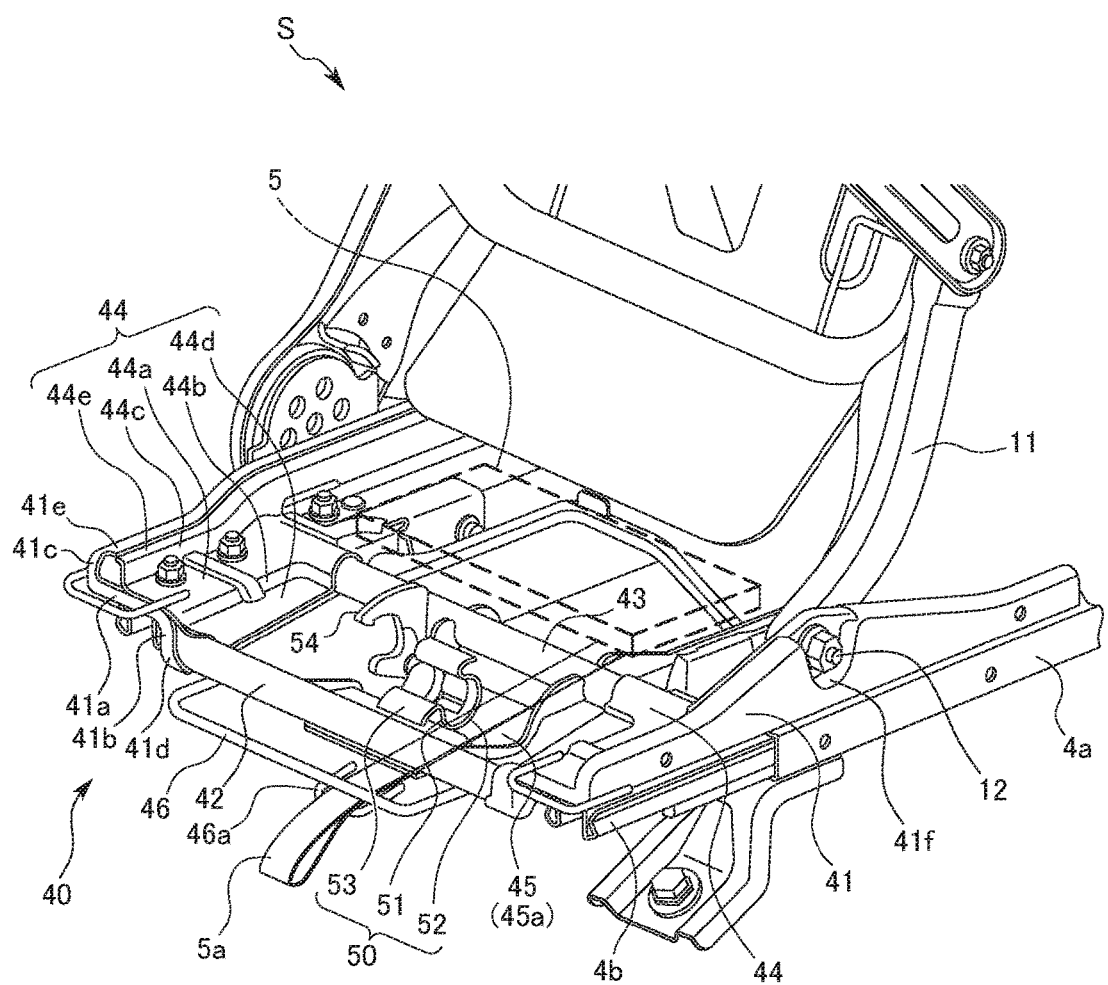
FIG. 3 is a perspective and partially enlarged view of the seat frame.

The right and left rail devices 4, disposed between the seat body B and the vehicle body floor in an up to down direction as shown in FIG. 2, are fixed on the vehicle body floor and configured as right and left lower rails 4a, which extend in the front to back direction of the seat, and right and left upper rails 4b, which are supported by the lower rails 4a and configured to be slidable therealong. The support base 40 is disposed on upper surfaces of the right and left upper rails 4b and installed therebetween. As shown in FIG. 3, the support base 40 is disposed on the upper surfaces of the right and left upper rails 4b and a rail lock device 5 is attached to the support base 40 and positioned further rearward in the front to back direction of the seat than an inertia lock device 54 (described below). The rail lock device 5 is configured with a known rail lock device which is lockable where the upper rails 4b are supported on the lower rails 4a. The rail lock device 5 has a rail operating member 5a configured to change the upper rails 4b between a locked state and an unlocked state. The rail operating member 5a is formed by a strip belt member and protrudes to the front side of the seat from the support base 40 while extending from a portion of the support base 40 on which the rail lock device 5 is attached.

The back frame 10 is formed by a frame body having a substantially rectangular shape and serves as a frame of the seat back 1. As shown in FIG. 2, right and left connecting brackets 11 configured to connect to the support base 40 are attached to outer lateral surfaces at lower portions of the back frame 10 in the right to left direction. The connecting brackets 11 are formed by a metallic plate member extending in the up to down direction and are formed in a generally bow-like shape as seen from a lateral surface of the seat. Respective upper end portions of the connecting brackets 11 are connected to the back frame 10 and respective lower end portions of the connecting brackets 11 are connected to the support base 40.

The upper end portion of the connecting bracket 11 is configured to be sandwiched between the back frame 10 and the cushion frame 20 in the right to left direction of the seat. The seat pivot shaft 12 is pivotally supported by the support base 40 in the right to left direction and disposed at the lower end portion of the left connecting bracket 11, and the reclining device 13 that connects the back frame 10 so that the back frame 10 is pivotable relative to the support base 40 is attached to the lower end portion of the right connecting bracket 11.

The reclining device 13 is formed by a known reclining device. As shown in FIG. 2, the reclining device 13 is disposed at an inner lateral surface of the connecting bracket 11 in the right to left direction, thereby being inhibited from interfering with the cushion frame 20 in the right to left direction. The reclining device 13 is generally configured with a seat pivot shaft 13a and a spiral spring 13b which allow the back frame 10 to pivot forward about the seat pivot shaft 13a and be biased towards the retracted state. The seat pivot shaft 13a is pivotally supported by the back frame 10 and the support base 40 in the right to left direction, and a first end portion of the spiral spring 13b is locked by the back frame 10 while a second end portion of the spiral spring 13b is locked by the support base 40. The reclining device 13 can change to a locked state where a pivotal movement of the back frame 10 is locked and the back frame 10 is locked in a stand-up state. The operating lever (not shown) is operated. Accordingly, the reclining device 13 releases the locked state and allows the back frame 10 to pivot forward by a biasing force of the spiral spring 13b; therefore, the back frame 10 can be folded toward the support base 40.

In addition, as shown in FIG. 2, right and left anchor members 15, each of which is formed in a substantially L shape, are fixed to right and left end portions, respectively, at the lower portions of the back frame 10. The anchor members 15 are formed as metallic members and configured to receive attachment portions (not shown) of a known child seat (not shown).

The cushion frame 20 is formed by a frame body having a substantially rectangular shape and that serves as the frame of the seat cushion 2. As shown in FIG. 2, the cushion frame 20 generally includes: right and left side frames 21 disposed at lateral sides of the cushion frame 20 in the right to left direction; a front connecting pipe 22 that connects front portions of the respective side frames 21; a center connecting pipe 23 that connects substantially center portions of the respective side frames 21 in the front to back direction; and a pan frame 24 that serves as a generally plate-shaped frame that connects the front connecting pipe 22 and the center connecting pipe 23. The side frames 21 are formed by a metallic plate member that extends in the front to back direction. A front portion of the side frame 21 is connected to the front connecting pipe 22, and the cushion pivoting device 25 that connects the cushion frame 20 so that the cushion frame 20 is pivotable relative to the back frame 10 is attached to an upper end portion at a rear section of the side frame 21. In addition, a flange portion 21a, bent outward in the right to left direction, is disposed in an outer rim portion of the side frame 21 as seen from the lateral surface of the seat, thereby increasing the support strength for the front connecting pipe 22 and the back frame 10.

Figure 9A:
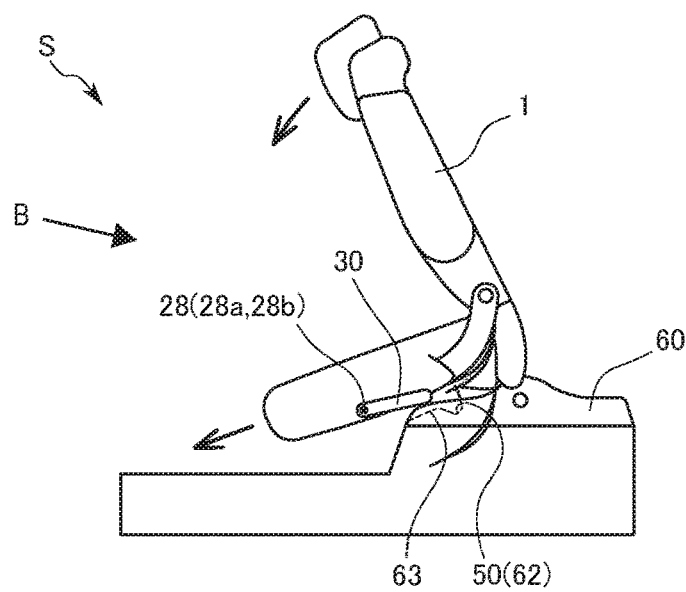
FIG. 9A, FIG. 9B, and FIG. 9C are side views of the vehicle seat, illustrating a movement of the vehicle seat to the retracted state.
Figure 11A:
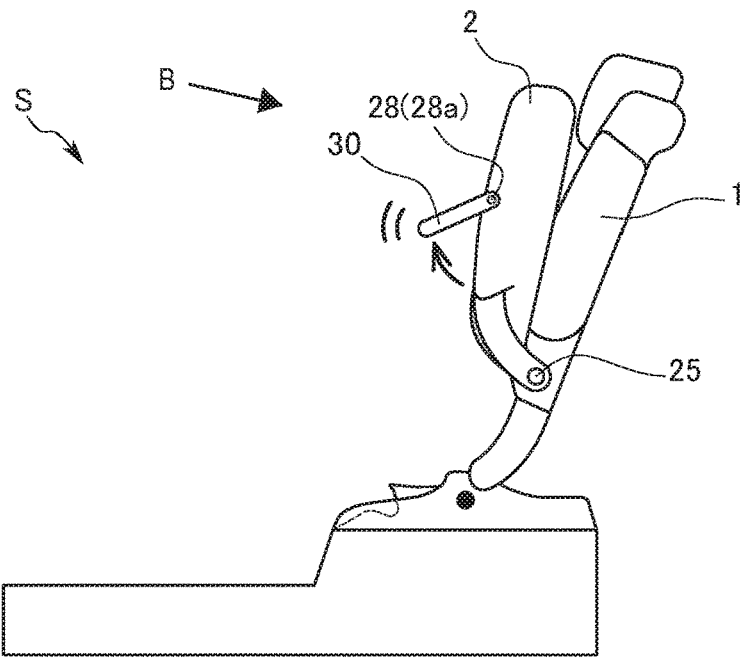
FIG. 11A and FIG. 11B are side views of the vehicle seat, illustrating a movement of the vehicle seat from the tip-up state to the seatable state.

The cushion pivoting device 25 is formed by a known cushion pivoting device, and as shown in FIG. 2, includes a cushion pivot shaft 25a and a spiral spring 25b configured to bias the cushion frame 20 in a downward direction about the cushion pivot shaft 25a. The cushion pivot shaft 25a is pivotally supported by the back frame 10 and the cushion frame 20 in the right to left direction. A first end portion of the spiral spring 25b is secured to the back frame 10 while a second end portion of the spiral spring 25b is secured to the cushion frame 20. The cushion pivoting device 25 can change to a locked state where a pivotal movement of the cushion frame 20 is locked. The cushion pivoting device 25 locks the pivotal movement of the cushion frame 20 when the seat body B is retracted in the retraction floor as shown in FIG. 9C, more specifically, in a state where the back frame 10 is folded onto the cushion frame 20. In addition, when the detachable leg 30 functioning as the operating lever is pulled as shown in FIG. 11A, the cushion pivoting device 25 releases the locked state and allows the cushion frame 20 to pivot in a downward direction relative to the back frame 10 by a biasing force of the spiral spring 27.

As shown in FIG. 2, the front connecting pipe 22 is formed by a pipe member having a substantially U-like shape and the leg pivoting device 28, which connects the detachable leg 30 so that the detachable leg 30 is pivotable relative to the cushion frame 20, is attached to an inner lateral surface of the front connecting pipe 22 in the right to left direction. The leg pivoting device 28 has a leg pivot shaft 28a and a spring member 28b configured to bias the detachable leg 30 about the leg pivot shaft 28a in a direction opposite to the cushion frame 20, i.e., in a direction away from the cushion frame 20. The leg pivot shaft 28a is pivotally supported by the front connecting pipe 22 and an upper end portion of the detachable leg 30 in the right to left direction. A first end portion of the spring member 28b is secured to the cushion frame 20 while a second end portion of the spring member 28b is secured to the detachable leg 30. The leg pivoting device 28 can change to a locked state where a pivotal movement of the detachable leg 30 is locked. The leg pivoting device 28 locks the pivotal movement of the detachable leg 30 when the detachable leg 30 is detached from the leg retaining member 50 to be retracted toward the cushion frame 20, as shown in FIG. 9A. Then, the detachable leg 30 in the locked state is pulled as shown in FIG. 11A, therefore being released from the locked state. Therefore, the detachable leg 30 can be moved by a biasing force of the spring member 28b to a position in which the detachable leg 30 can be fitted into the leg retaining member 50 so that the seat body B is returned to the seatable state.

As shown in FIG. 2, the detachable leg 30 is a pipe member having a substantially U-like shape for supporting the seat cushion 2, and includes leg body portions 31 which are disposed at the lateral sides in the right to left direction and a leg connecting portion 32 which connects lower end portions of the respective leg body portions 31. Upper end portions of the leg body portions 31 are connected to substantially intermediate portions of the cushion frame 20 in the front to back direction, which are on lateral surfaces of the cushion frame 20 in the right to left direction. A substantially intermediate portion of the leg connecting portion 32 in the right to left direction is detachably retained by the leg retaining member 50. The detachable leg 30 is configured so that the upper end portions of the leg body portions 31 are jutted further forward than the lower end portions of the leg body portions 31 in the front to back direction of the seat, therefore being inclined forward and extending upward from the lower end portions of the leg body portion 31 to the upper end portions of the leg body portion 31.

The support base 40 is a member which supports the seat body B. As shown in FIG. 3, the support base 40 includes right and left side base portions 41 which are disposed at lateral sides of the support base 40 in the right to left direction along the upper rails 4b, a first base connecting portion 42 which connects front portions of the respective side base portions 41, a second base connecting portion 43 which connects substantially intermediate portions of the respective side base portions 41, right and left reinforcement base portions 44 which are attached to upper surfaces of the respective side base portions 41, and a retaining member support portion 45 which connects the first base connecting portion 42 and the second base connecting portion 43 and supports the leg retaining member 50. In addition, a base jutted portion 46 jutted from the first base connecting portion 42 to the front side of the seat and having a substantially U-like shape is attached to both right and left end portions of the first base connecting portion 42.

The side base portion 41 is formed by a metallic plate member formed in a substantially eccentric-shape, elongated in the front to back direction. As shown in FIG. 3, the side base portion 41 is generally configured with a connecting wall portion 41a connected to the upper surface of the upper rail 4b, an inner wall portion 41b bent downward from an inner end portion of the connecting wall portion 41a in the right to left direction, and an outer wall portion 41c bent upward from an outer end portion of the connecting wall portion 41a in the right to left direction. In the side base portion 41, flange portions 41d, 41e respectively folded inward in the right to left direction are disposed in a lower end portion of the inner wall portion 41b and at an upper end portion of the outer wall portion 41c. In addition, a notch 41f having a substantially semicircular shape is formed in a portion of the left side base portion 41, which faces the seat pivot shaft 12 as seen from the lateral surface of the seat, thereby allowing the seat pivot shaft 12 to be more easily installed from the lateral surface of the seat.

As shown in FIG. 3, the first base connecting portion 42 and the second base connecting portion 43 are formed by pipe members that extend in the right to left direction and have a substantially circular shape and are spaced at a predetermined distance therebetween in the front to back direction. As shown in FIG. 3, the reinforcement base portion 44 is formed by a metallic plate member formed in a substantially eccentric-shape, elongated in the front to back direction. The reinforcement base portion 44 is configured with a connecting wall portion 44a connected to the upper surface of the side base portion 41, an inner wall portion 44b bent downward from an inner end portion of the connecting wall portion 44a in the right to left direction, and an outer wall portion 44c bent upward from an outer end portion of the connecting wall portion 44a in the right to left direction. In the reinforcement base portion 44, a flange portion 44d folded inward in the right to left direction is disposed in a lower end portion of the inner wall portion 44b and a flange portion 44e folded outward in the right to left direction is disposed in an upper end portion of the outer wall portion 44c.

As shown in FIG. 3, both right and left end portions of the first base connecting portion 42 are respectively connected to be sandwiched between the side base portion 41 and the reinforcement base portion 44, and both right and left end portions of the second base connecting portion 43 are respectively connected to be sandwiched between the side base portion 41 and the reinforcement base portion 44. The reinforcement base portion 44 is attached by the connecting wall portion 44a to the side base portion 41. In addition, the flange portion 44e of the reinforcement base portion 44 is overlapped with the flange portion 41e of the side base portion 41 in the up to down direction to form a closed cross-section structure; thereby, the support strength of the support base 40 is increased. In other words, the support base 40 is formed to have a hollow structure. The left reinforcement base portion 44 is connected to be sandwiched between the connecting bracket 11 and the side base portion 41 in the right to left direction.

As shown in FIG. 3, the retaining member support portion 45 is a metallic plate member having a curved shape configured to support the leg retaining member 50. The retaining member support portion 45 extends in the front to back direction of the seat and has a folded and bent portion 45a which is disposed in a substantially intermediate portion in the front to back direction to be bent further downward than front and rear portions. The front portion of the retaining member support portion 45 is attached to the first base connecting portion 42 while the rear portion of the retaining member support portion 45 is attached to the second base connecting portion 43. The leg retaining member 50 is attached to an upper surface of the folded and bent portion 45a.

As shown in FIG. 3, a metallic member having a substantially circular shape in cross-section is folded and bent to thereby form the base jutted portion 46. A retaining portion 46a for retaining a jutted portion of the rail operating member 5a is disposed in a portion of the base jutted portion 46, which is jutted toward the front side of the seat and positioned to face the rail operating member 5a of the rail lock device 5. In addition, an attached portion to which the base jutted portion 46 is attached is located between a closed cross-section frame, which is formed by the side base portion 41 and the reinforcement base portion 44, and the retaining member support portion 45 in a seat width direction, therefore increasing the support strength.

The leg retaining member 50 is formed by a clip member formed in a substantially U-like shape for retaining the detachable leg 30 so that the detachable leg 30 is detachable. As shown in FIG. 3, the leg retaining member 50 is configured with a pair of side wall portions 51 and a bottom wall portion 52 which connects lower end portions of the respective side wall portions 51. The side wall portions 51 are respectively bent to come close to each other in a direction from the lower end portion to the upper end portion. In other words, the side wall portion 51 is bent toward the inner side of an opening of the leg retaining member 50 to reduce a size of the opening therebetween. A curled portion 53 curved toward the outer side of the opening is disposed in the upper end portion of the side wall portion 51. The bottom wall portion 52 is formed of a curved shape and is attached to the folded and bent portion 45a of the retaining member support portion 45 along the folded and bent portion 45a. Generally, the bottom wall portion 52 is partially cut and raised therefrom to include a cut-and-raised portion (not shown). The cut-and-raised portion is retained and locked by a retaining groove (not shown) disposed in the folded and bent portion 45a; thereby, the bottom wall portion 52 is fixed.

The leg retaining member 50 is positioned to be inclined rearward at a predetermined inclination angle relative to a horizontal surface and is supported by the retaining member support portion 45. In other words, the leg retaining member 50 is supported by the retaining member support portion 45 to be positioned in such a manner that the opening faces diagonally forward and upward. The inertia lock device 54, which locks the detachable leg 30 in a state where the leg connecting portion 32 at the lower end of the detachable leg 30 is retained by the leg retaining member 50 at the time of a front collision of a vehicle, is disposed at an adjacent portion to the leg retaining member 50.

The inertia lock device 54 is formed by a known inertia lock device. As shown in FIG. 3, the inertia lock device 54 is attached to the support base 40 and is disposed between the first base connecting portion 42 and the second base connecting portion 43 in the front to back direction. Further, the inertia lock device 54 is disposed in a position to overlap the leg retaining member 50 in the right to left direction.

Figure 4:
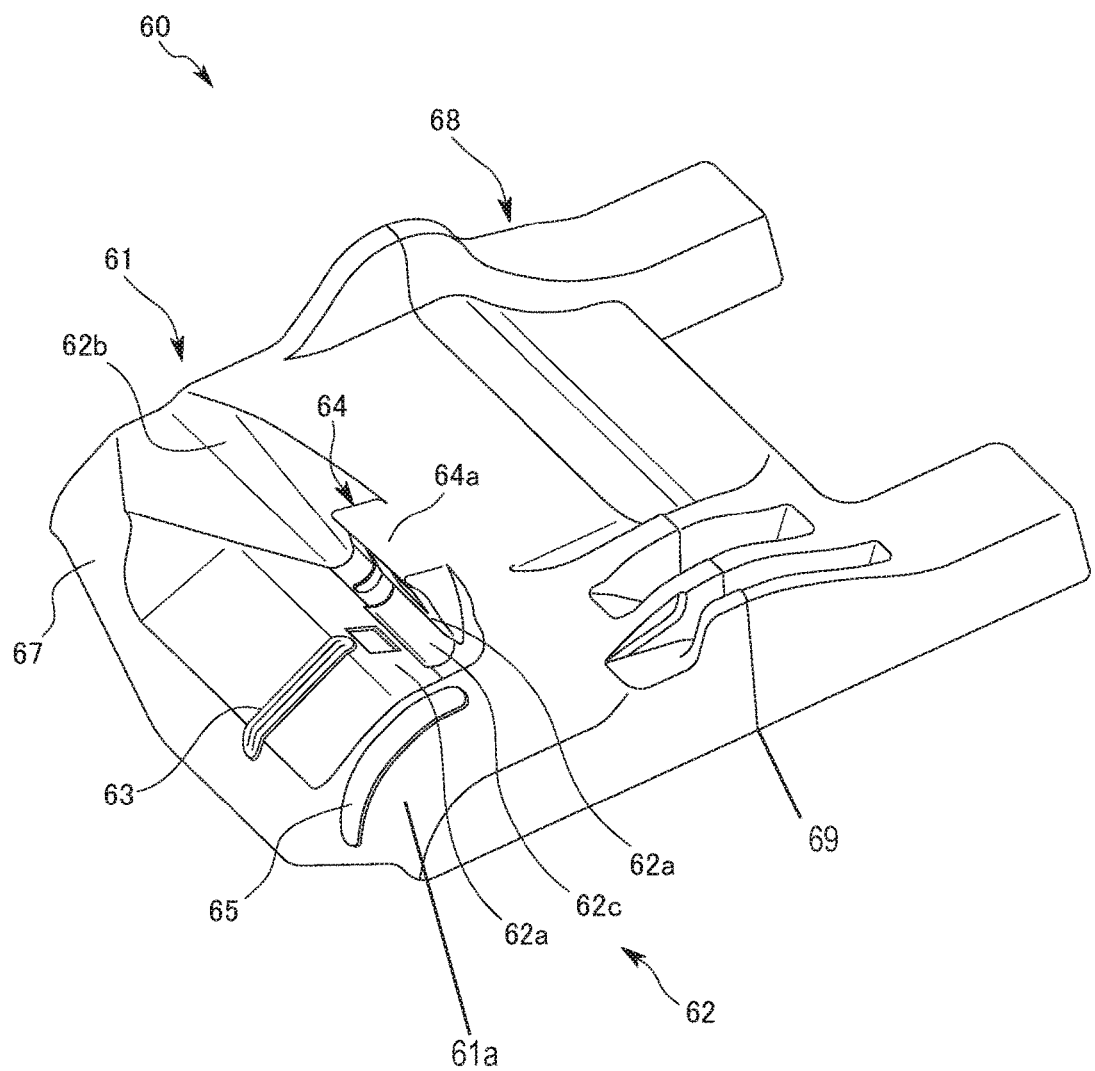
FIG. 4 is a perspective view of a base cover configured to protect a support base for the vehicle seat.
Figure 5:
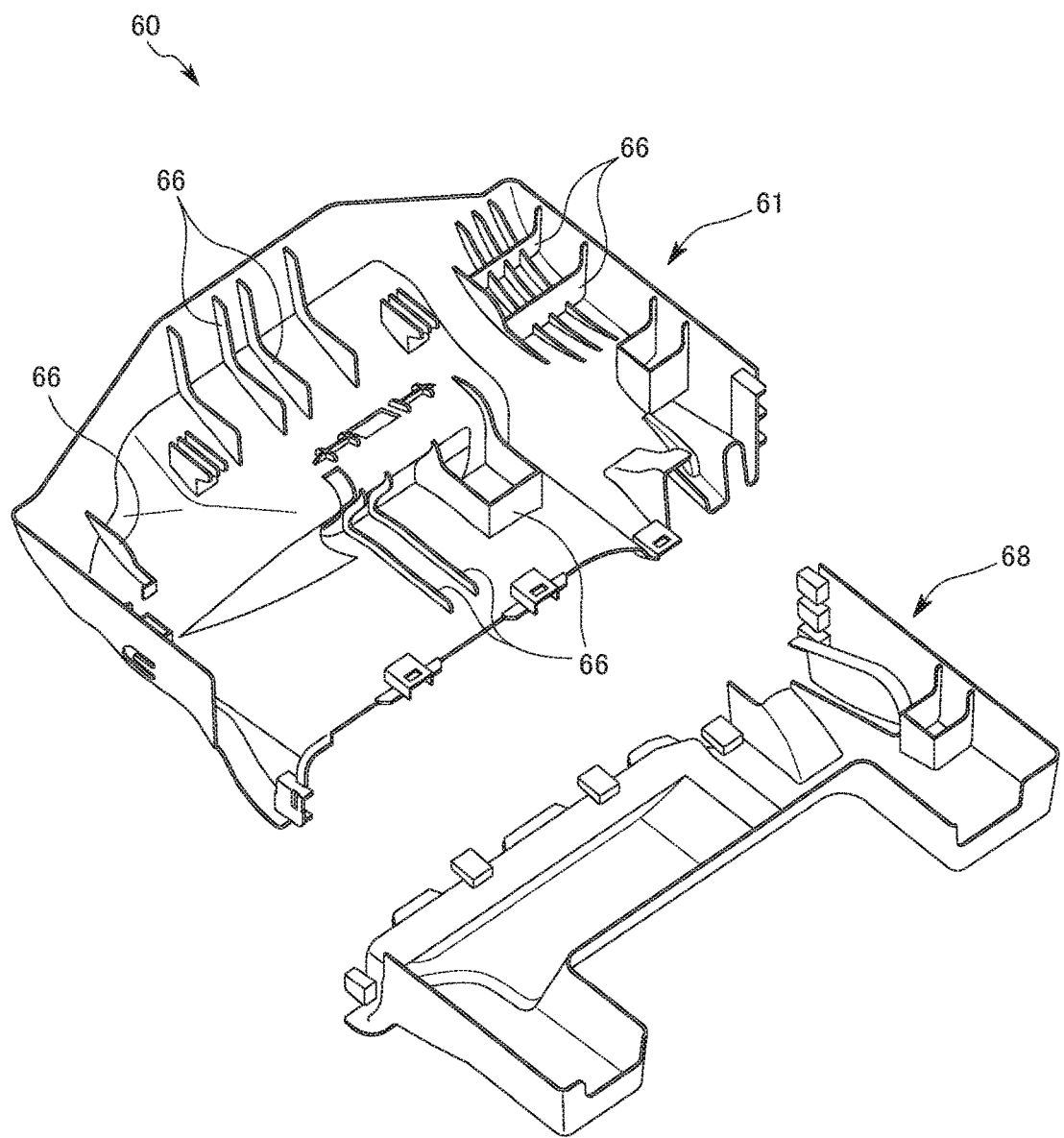
FIG. 5 is an exploded perspective view of the base cover.

The base cover 60 is a resin molded product which covers the whole of the support base 40 from above the support base 40. As shown in FIG. 4 and FIG. 5, the base cover 60 is configured with a front cover portion 61 which is disposed at a front side and a rear cover portion 68 which is disposed at a rear side of the front cover portion 61. As shown in FIG. 4, the front cover portion 61 generally includes a leg retraction recessed portion 62 which retracts the detachable leg 30, a leg guide portion 63 which is disposed at a front side of the leg retraction recessed portion 62 and which guides the detachable leg 30 when detached from the leg retaining member 50 to be retracted toward the seat cushion 2, a leg movement restriction portion 64 which is disposed at a rear side of the leg retraction recessed portion 62 and which restricts the detached detachable leg 30 from moving to the rear side of the leg retraction recessed portion 62, and a base contact portion 65 which is disposed at the front side of the leg retraction recessed portion 62 and which is contactable with a portion of the seat cushion 2. The leg retraction recessed portion 62, the leg guide portion 63, the leg movement restriction portion 64, and the base contact portion 65 are respectively formed integrally with the front cover portion 61.

The leg retraction recessed portion 62 is formed by a substantially U-shaped recessed portion which is recessed downward from a substantially intermediate portion of an upper surface of the base cover 60, and it is formed as an elongated body extending in the right to left direction. The leg retraction recessed portion 62 is configured with front and rear wall portions 62a, a pair of side wall portions 62b (e.g., right and left side wall portions), and a bottom wall portion 62c which connects respective lower end portions of the front and rear wall portions 62a and respective lower end portions of the pair of side wall portions 62b and which is positioned so that its opening faces diagonally forward and upward. In the leg retraction recessed portion 62, substantially quadrangular through holes are respectively formed in the center in the right to left direction of the front and rear wall portions 62a. As shown in FIG. 1, the pair of side wall portions 51 and the curled portion 53 that forms the leg retaining member 50 protrude through the through holes from a back surface of the base cover 60 to be exposed to the outside. Further, a through hole elongated in the up to down direction is formed continuously in the front and rear wall portion 62a at the rear side and the bottom wall portion 62c, and a portion of the inertia lock device 54 protrudes through the through hole from the back surface of the base cover 60 to be exposed to the outside.

The leg guide portion 63 is formed by a protruding portion that protrudes upward from the upper surface of the base cover 60 and is an elongated body extending in the front to back direction and is compactly formed into a shape relatively smaller in width in the right to left direction than in the front to back direction. In addition, the leg guide portion 63 is formed to be slightly jutted forward from a front surface of the base cover 60. The leg guide portion 63 is disposed in the substantially center of the base cover 60 in the right to left direction and at a front portion of the base cover 60 to extend substantially continuously from the leg retraction recessed portion 62 in the front to back direction. In a state where the seat body B is in the seatable state, the leg guide portion 63 configured as described above is disposed at a front side of the detachable leg 30 as shown in FIG. 1 and is disposed at a rear side of the retraction floor as shown in FIG. 8A. Therefore, as shown in FIG. 9A, the leg guide portion 63 is brought into contact with the detachable leg 30 when detached from the leg retaining member 50 and the leg retraction recessed portion 62 and thereby can guide the detachable leg 30 to pivot about the leg pivot shaft 26a toward the seat cushion 2 and be retracted thereto.

As shown in FIG. 4, the leg movement restriction portion 64 is formed by a portion of the base cover 60, which is jutted from the substantially intermediate portion of the upper surface to the front side of the seat. The leg movement restriction portion 64 is continuously formed with a rear portion of the leg retraction recessed portion 62 in the front to back direction of the seat and is implemented as an elongated body extending in the right to left direction of the seat. The leg movement restriction portion 64 is configured so that its width in the front to back direction increases from the lower end to the upper end. A protruding portion 64a that protrudes upward from the upper surface of the base cover 60 is disposed in the upper end of the leg movement restriction portion 64. The protruding portion 64 is further jutted toward the front side of the seat.

The base contact portion 65 is formed by a protruding portion that slightly protrudes upward from the front portion of the upper surface of the base cover 60, and is an elongated body that extends in the front to back direction of the seat and is formed into a shape relatively smaller in width in the right to left direction of the seat than in the front to back direction. In addition, the base contact portion 65 is formed to have a relatively low friction coefficient. The base contact portion 65 is positioned to be contactable with a cushion contact portion 71, which is disposed at a cushion cover 70 as described below, when the seat body B moves between the retracted state and the seatable state. The base contact portion 65 has a curved surface formed of a substantially protrusion jutted toward the cushion cover 70.

In the base cover 60, as shown in FIG. 5, reinforcement ribs 66 each having a predetermined shape are formed on a back surface (e.g., facing the support base 40) of each of the leg retraction recessed portion 62, the leg movement restriction portion 64, and the base contact portion 65. Thus, the base cover 60 is formed so that a portion thereof that benefits from increased support strength has extra support strength due to making contact with other components.

Figure 6A:
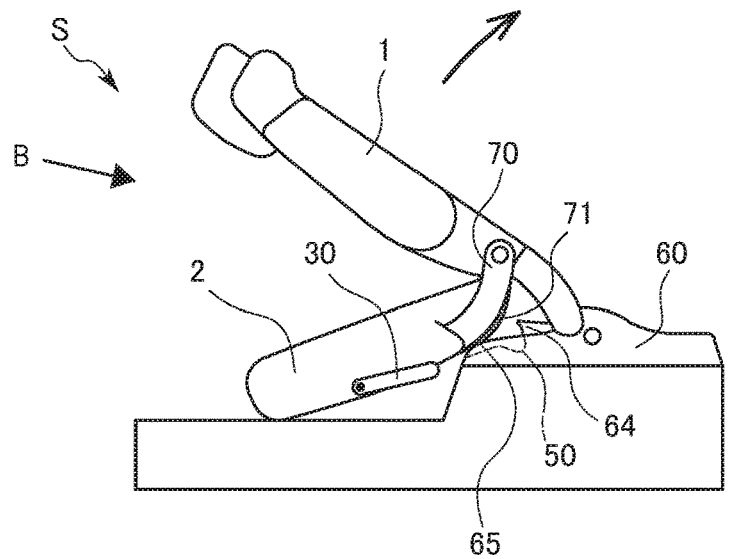
FIG. 6A and FIG. 6B are side views of the vehicle seat, illustrating a movement of a detachable leg which is brought into contact with a leg retaining member, according to an embodiment.
Figure 6B:
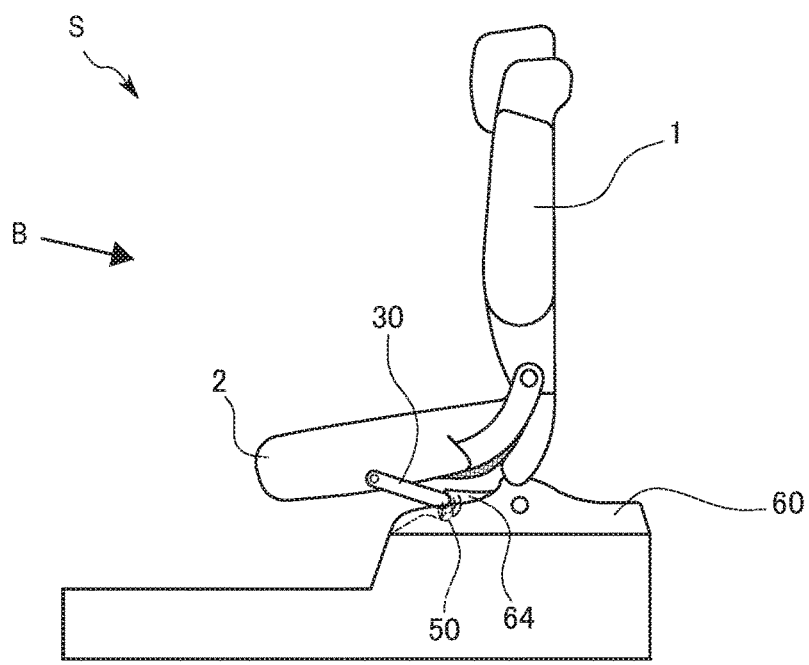

As shown in FIG. 1, the cushion cover 70 is formed as a resin molded product formed in a substantially U-like shape which covers each of the right and left side frames 21 of the seat cushion 2 shown in FIG. 2 from the outer side in the right to left direction. The cushion cover 70 is disposed at a rear side of the detachable leg 30 in the front to back direction of the seat. As shown in FIG. 6, the cushion contact portion 71 jutted toward the base cover 60 is integrally formed with a bottom surface of the cushion cover 70. The cushion contact portion 71 having a curved surface formed of a substantially protrusion is positioned to overlap the base contact portion 65 in the right to left direction of the seat. When the cushion contact portion 71 is brought into contact with the base contact portion 65 as shown in FIG. 6A in a state where the seat body B moves between the retracted state and the seatable state, the seat cushion 2 is moved onto the base cover 60; therefore, the detachable leg 30 can more stably move.

Leg Retaining Member

The leg retaining member 50 serves to restrict the movement path of the detachable leg 30 moving along with the seat body B when the seat body B returns from the retracted state to the seatable state. In an embodiment, when the seat body B moves from the retracted state shown in FIG. 6A to the seatable state shown in FIG. 6B, the detachable leg 30 is brought into contact with the leg movement restriction portion 64, thereby being restricted from moving rearward and being guided toward the leg retaining member 50.

For example, during movement of the seat body B from the seatable state to the retracted state, the seat body B may be sometimes moved to return to the seatable state. In such returning operation, when an occupant tries to relatively roughly return the seat body B to the seatable state, the detachable leg 30 is moved beyond the leg retaining member 50. As a result, the detachable leg 30 may not be fitted again into the leg retaining member 50 in a conventional vehicle seat. However, in this embodiment, during movement of the seat body B from the retracted state shown in FIG. 6A to the seatable state shown in FIG. 6B, the detachable leg 30 is configured to be brought into contact with the leg movement restriction portion 64. Therefore, the detachable leg 30 can be more stably fitted again into the leg retaining member 50 while not moving beyond the leg retaining member 50.

Figure 7:
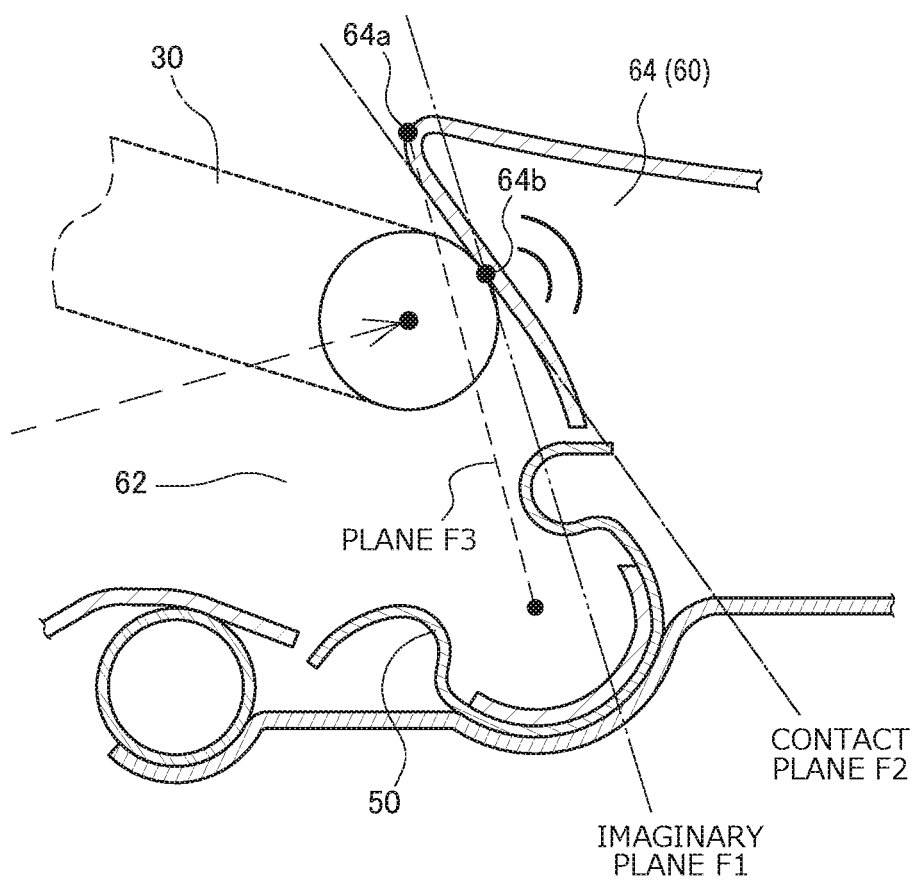
FIG. 7 is an enlarged view of the detachable leg and leg retaining member of FIG. 6B.

The leg movement restriction portion 64 serving as the leg movement restriction part is explained in detail on the basis of FIG. 7. The protruding portion 64a of the leg movement restriction portion 64 is formed above a contact portion 64b of the leg movement restriction portion 64 with which the detachable leg 30 is contactable. The protruding portion 64a protrudes toward the front side of the seat relative to an imaginary plane F1 which is a plane perpendicular to a direction in which the detachable leg 30 is brought into contact with the contact portion 64b and passing through the contact portion 64b. In other words, a contact plane F2 of the leg movement restriction portion 64 with which the detachable leg 30 is brought into contact is inclined toward the front side of the seat relative to the imaginary plane F1. Also, in other words, the contact portion 64b is disposed at a rear side of a plane F3, which is defined by the leg retaining member 50 and a protruding tip end of the protruding portion 64a, in the front to back direction of the seat. With the above-mentioned configuration, at the time of retracting the detachable leg 30 in moving into the leg retraction recessed portion 62, the leg movement restriction portion 64 can restrict the rearward movement of the detachable leg 30 and guide the detachable leg 30 toward the leg retaining member 50.

Seat Retracting Operation

Next, an operation for moving the seat body B from the seatable state to the retracted state is described on the basis of FIG. 8 and FIG. 9. Note that the reclining device 13, the cushion pivoting device 25, and the leg pivoting device 28 are in the locked state when illustrated by a black circle in FIG. 8 and FIG. 9 and that the reclining device 13, the cushion pivoting device 25, and the leg pivoting device 28 are in the unlocked state when illustrated by a white circle. Similar indicators of the locked or unlocked state apply to FIGS. 10 to 13.

When the vehicle seat S is in the seatable state shown in FIG. 8A, the seat back 1 is supported by the support base 40 and is locked in the stand-up state by the reclining device 13. The seat cushion 2 connected to the seat back 1 is supported from below by the detachable leg 30 retained by the leg retaining member 50. The leg pivot shaft 26a located at the upper end portion of the detachable leg 30 is disposed at a front side of the leg retaining member 50 when the seat body B is in the seatable state. Further, the leg retaining member 50 is disposed at a rear side of a front end portion of a portion of the base cover 60, which covers the support base 40 from above the support base 40.

In the event of moving the vehicle seat S from the seatable state to the retracted state, for example, the operating lever (not shown) disposed on an upper surface of the seat back 1 is operated. The operating lever is operated by an occupant; thereby, as shown in FIG. 8B, the locked state of the reclining device 13 is released and the seat back 1 starts pivoting about the seat pivot shaft 12 toward the front side of the seat by the biasing force of the spiral spring 14 to move the seat cushion 2 towards the retraction floor. In conjunction with the pivotal movement of the seat back 1, the detachable leg 30 starts pivoting relative to the seat cushion 2 about the leg pivot shaft 28a toward the seat cushion 2. At this time, the detachable leg 30 is sandwiched between the seat cushion 2 and the vehicle body floor; therefore, the seat cushion 2 and the seat back 1 can be stably moved. In addition, a cable (not show) is connected between the operating lever and the reclining device 13, and the cable is pulled by the operation of the operating lever to thereby release the locked state.

When the seat back 1 has reached a predetermined pivoted position as shown in FIG. 9A, the detachable leg 30 detaches from the leg retaining member 50. In other words, when the detachable leg 30 has reached a predetermined pivoted position in conjunction with the pivotal movement of the seat back 1, the detachable leg 30 detaches from the leg retaining member 50. The detachable leg 30, when detached, moves up onto the upper surface of the base cover 60, thereby pivoting about the leg pivot shaft 28a against the biasing force of the spring member 28b to be folded toward the seat cushion 2. Then, when the detachable leg 30 has reached a predetermined pivoted position, the detachable leg 30 is locked while being retracted toward the seat cushion 2 by the leg pivoting device 28. At this time, the detachable leg 30 is guided by the leg guide portion 63 (not shown) of the base cover 60 to be retracted toward the seat cushion 2.

Figure 9B:
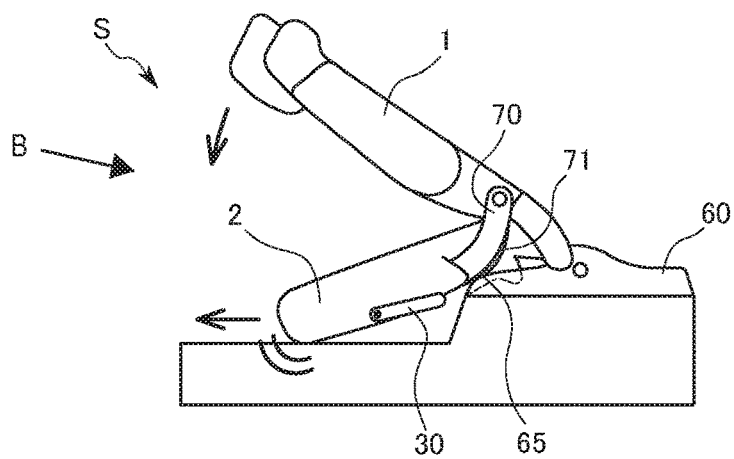
Figure 9C:
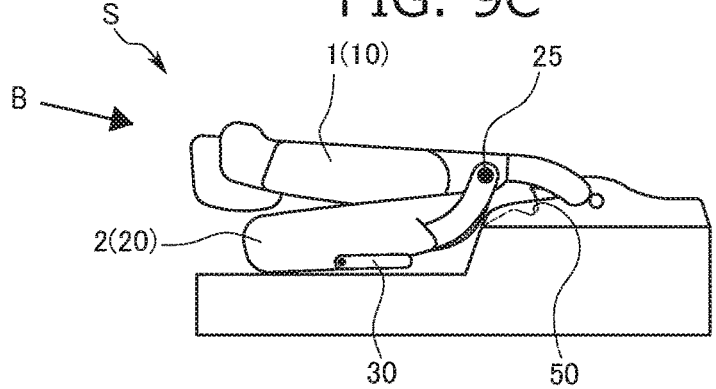

Further, when the seat back 1 has reached a predetermined pivoted position as shown in FIG. 9B, the cushion contact portion 71 is brought into contact with the base contact portion 65. Then, a front portion of the seat cushion 2 is brought into contact with a surface of the retraction floor before the detachable leg 30 makes contact with the surface of the retraction floor. Furthermore, a slide member (not shown) that is slidable on the surface of the retraction floor is attached to the front portion of the seat cushion 2; thereby, the seat cushion 2 can stably slide on the surface of the retraction floor toward the front side of the seat.

According to a series of the above-mentioned operations, as shown in FIG. 9C, the seat body B is retracted in the retraction floor and the vehicle seat S changes to the retracted state. The seat cushion 2 is locked by the cushion pivoting device 25 when the seat body B is in the retracted state, more specifically, when the seat back 1 is folded onto the seat cushion 2. Further, the cushion pad 2a of the seat back 1 is configured so that a portion overlapped with the leg retaining member 50 in the up to down direction when the seat body B is in the retracted state may have a relatively small thickness. Furthermore, the pair of anchor members 15 of the back frame 10 is positioned so as not to overlap the leg movement restriction portion 64 disposed at the base cover 60 in the up to down direction when the seat body B is in the retracted state. In addition, the detachable leg 30 is moved to a position lower than the leg retaining member 50 when the seat body B is in the retracted state.

Seat Tip-Up Operation

Figure 10A:
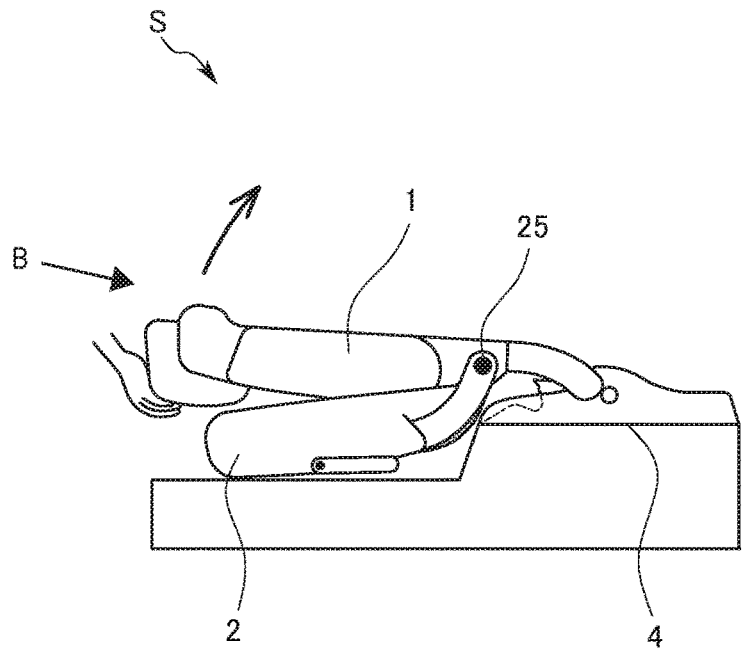
FIG. 10A and FIG. 10B are side views of the vehicle seat, illustrating a movement of the vehicle seat from the retracted state to a tip-up state.
Figure 10B:
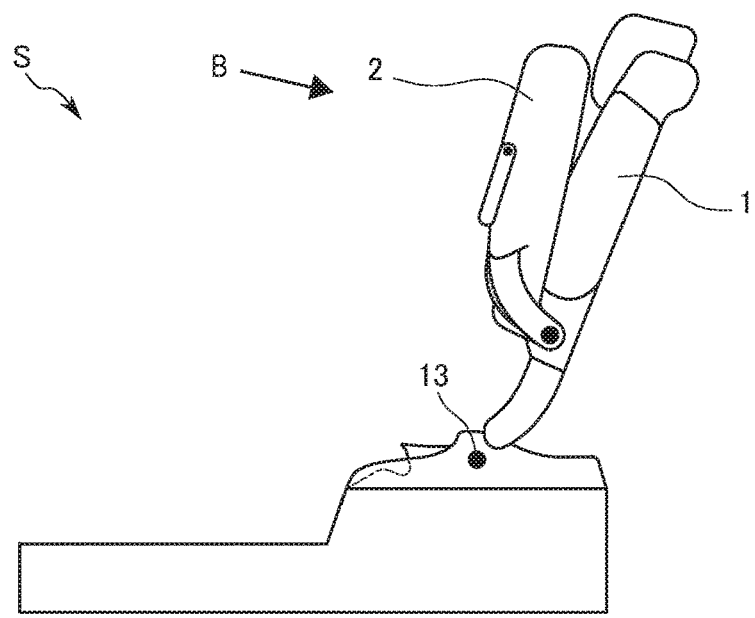

Next, an operation for moving the seat body B from the retracted state to the tip-up state is described on the basis of FIG. 10. When the vehicle seat S is in the retracted state shown in FIG. 10A, for example, the seat body B is moved upward manually by an occupant; therefore, the vehicle seat S changes to the tip-up state shown in FIG. 10B. At this time, the pivotal movement of the seat cushion 2 is locked by the cushion pivoting device 25. Accordingly, the seat back 1 is moved upward and thereby the seat cushion 2 can be integrally moved upward. In addition, when the seat body B is in the tip-up state, the upper rail 4b is slid rearward relative to the lower rail 4a in the front to back direction of the seat; thereby, a further larger space at the front side of the seat can be secured for a luggage compartment.

When the vehicle seat S changes to the tip-up state shown in FIG. 10B, the seat back 1 returns to the same position as in the seatable state to be locked in the stand-up state by the reclining device 13.

Seat Returning Operation

Next, an operation for moving the seat body B from the tip-up state to the seatable state is described on the basis of FIG. 11. In the event of moving the vehicle seat S from the tip-up state to the seatable state, the detachable leg 30 functioning, for example, as the operating lever is operated as shown in FIG. 11A. The detachable leg 30 is pulled by an occupant to pivot upward about the leg pivot shaft 28a, i.e., the detachable leg 30 is pulled in a direction away from the seat cushion 2; thereby, the locked states of the cushion pivoting device 25 and the leg pivoting device 28 are released (e.g., to an unlocked state). In addition, a cable (not shown) is connected between the detachable leg 30 and the cushion pivoting device 25. The cable is pulled by the operation of the detachable leg 30; therefore, the locked state is released.

Figure 11B:
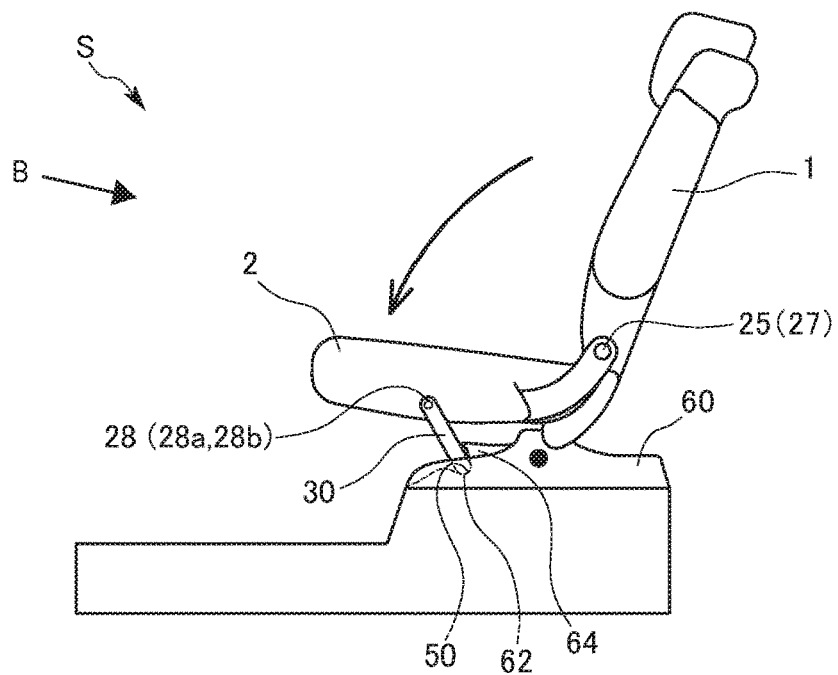

Along with the release of the cushion pivoting device 25 from the locked state, the seat cushion 2 pivots in a downward direction relative to the seat back 1 by the biasing force of the spiral spring 27 as shown in FIG. 11B. Along with the release of the leg pivoting device 28 from the locked state, the detachable leg 30 pivots about the leg pivot shaft 28a by the biasing force of the spring member 28b to a position in which the detachable leg 30 can be fitted into the leg retaining member 50, thereafter the detachable leg 30 is fitted into the leg retaining member 50. At this time, the detachable leg 30 is guided by the leg retraction recessed portion 62 and the leg movement restriction portion 64 of the base cover 60, thereby moving toward the leg retaining member 50 attached to a lower end of the leg retraction recessed portion 62. According to a series of the above-mentioned operations, the vehicle seat S returns to the seatable state shown in FIG. 11B.

In the above-mentioned configuration, as shown in FIG. 8A, the leg retaining member 50 is disposed at a rear side of a stepped portion of the vehicle body floor, which is connected to the retraction floor, in the front to back direction of the seat. This configuration allows the detachable leg 30 when retained by the leg retaining member 50 to be compactly disposed. Further, the detachable leg 30 is configured to support a substantially intermediate portion of the seat cushion 2 in the front to back direction; therefore, the support strength for the seat cushion 2 can be increased. In addition, the vehicle body floor includes the stepped portion but it does not include the retraction floor.

Second Embodiment of Vehicle Seat

Next, a second example of the vehicle seat is described on the basis of FIG. 12 and FIG. 13. Explanations of contents overlapping with the contents of the above-described vehicle seat S are omitted from the description below. A vehicle seat S2 according to the second example is different from the first embodiment in that a lockoff device 80 configured to release the cushion pivoting device 25 in the locked state therefrom to the unlocked state is included. Further, compared to the above-described vehicle seat S, the vehicle seat S2 is configured as a "one-motion" type vehicle seat which can change the seat body B directly from the retracted state to the seatable state.

The lockoff device 80 is configured with a lock on/off device, is attached to a seat rear end of the seat cushion 2, and is positioned to overlap the cushion contact portion 71 in the front to back direction of the seat. Specifically, the lockoff device 80 and the cushion contact portion 71 are disposed respectively at the right side frame 21 and the left side frame 21 of the seat cushion 2. The lockoff device 80 partially protrudes from the seat rear end of the seat cushion 2 toward a rear side of the seat and includes a lockoff lever 81 which changes the cushion pivoting device 25 between the locked and unlocked states.

The lockoff lever 81 is attached to and positioned at a lever contact portion 67 to be contactable with the lever contact portion 67 located at a seat front surface portion of the base cover 60. When the seat body B is moved from the seatable state to the retracted state shown in FIG. 12A, the lockoff lever 81 moving along with the seat cushion 2 makes contact with the lever contact portion 67 of the base cover 60 and is further pressed toward the front side of the seat to pivot about a lockoff lever pivot shaft (not shown); thereby, the lockoff device 80 can change the cushion pivoting device 25 from the locked state to the unlocked state.

Figure 12A:
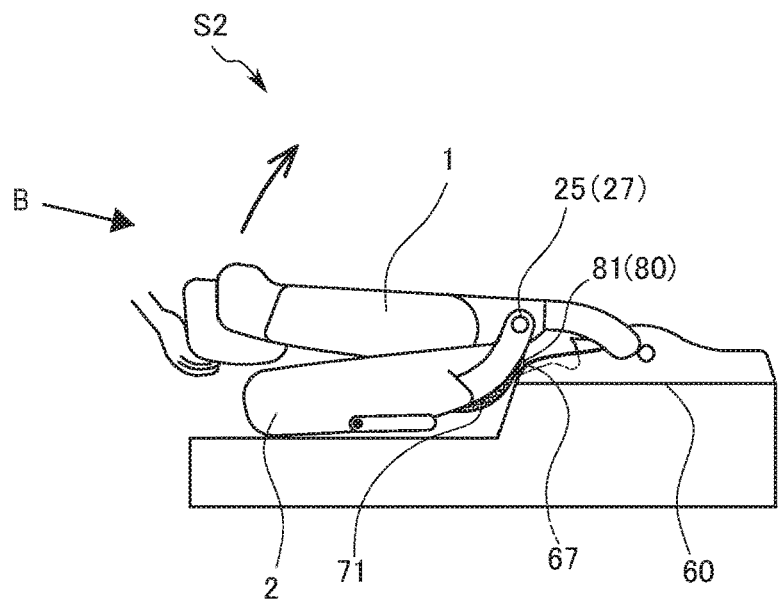
FIG. 12A and FIG. 12B are side views of the vehicle seat, illustrating a movement of the vehicle seat from the retracted state directly to the seatable state, according to a second embodiment.
Figure 13A:
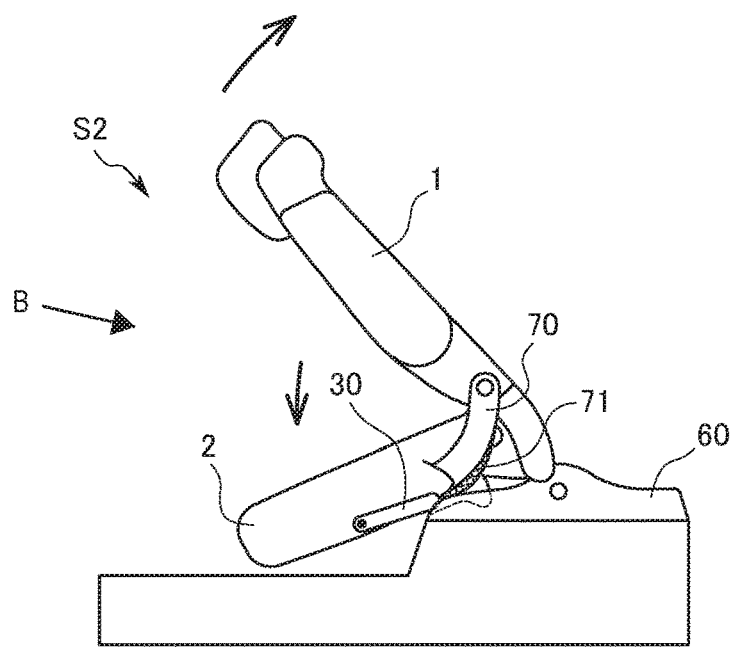
FIG. 13A and FIG. 13B are side views of the vehicle seat according to the second embodiment, illustrating a movement of the vehicle seat from the retracted state directly to the seatable state.
Figure 13B:
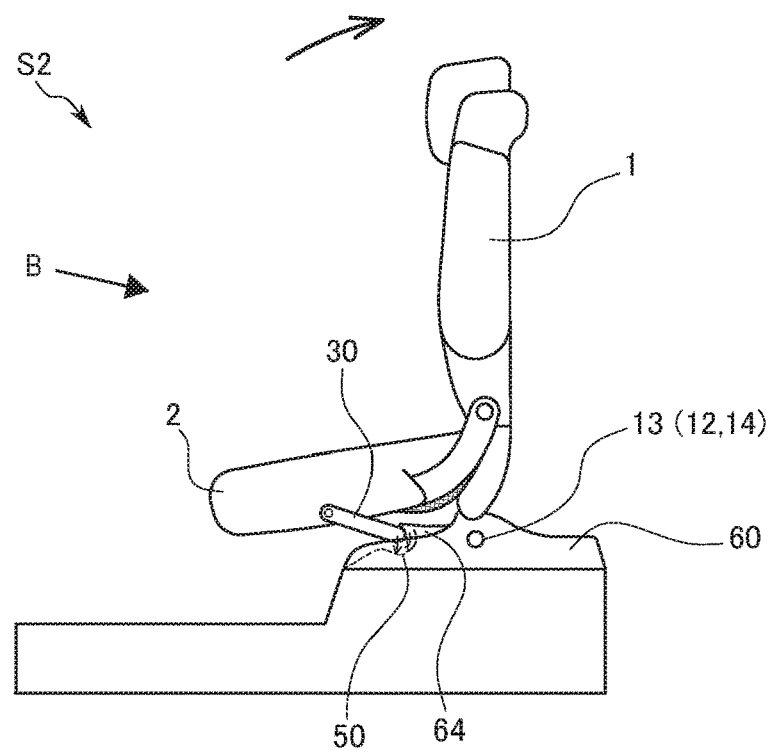
Figure 14:
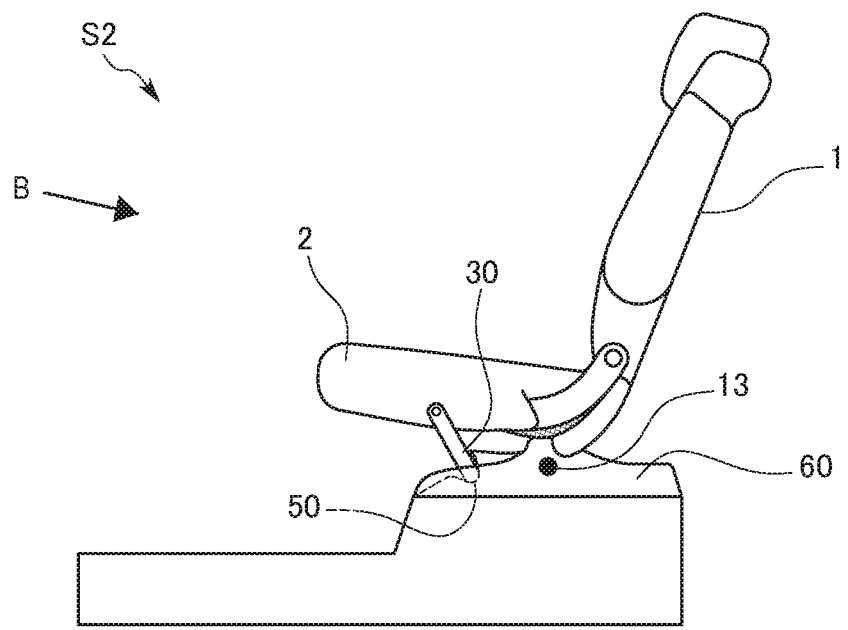
FIG. 14 is a side view of the vehicle seat according to the second embodiment, illustrating the vehicle seat in the seatable state.

Next, an operation for returning the seat body B directly from the retracted state to the seatable state is described on the basis of FIGS. 12 to 14. Firstly, when the vehicle seat S2 is in the retracted state shown in FIG. 12A, the lockoff lever 81 is in contact with the lever contact portion 67 of the base cover 60. An occupant manually moves the seat body B upward; thereby, the lockoff lever 81 is pressed toward the front side of the seat to pivot and therefore the lockoff device 80 releases the locked state of the cushion pivoting device 25. Along with the release of the cushion pivoting device 25 from the locked state, the seat cushion 2 slightly pivots in a downward direction relative to the seat back 1 by the biasing force of the spiral spring 27.

Figure 12B:
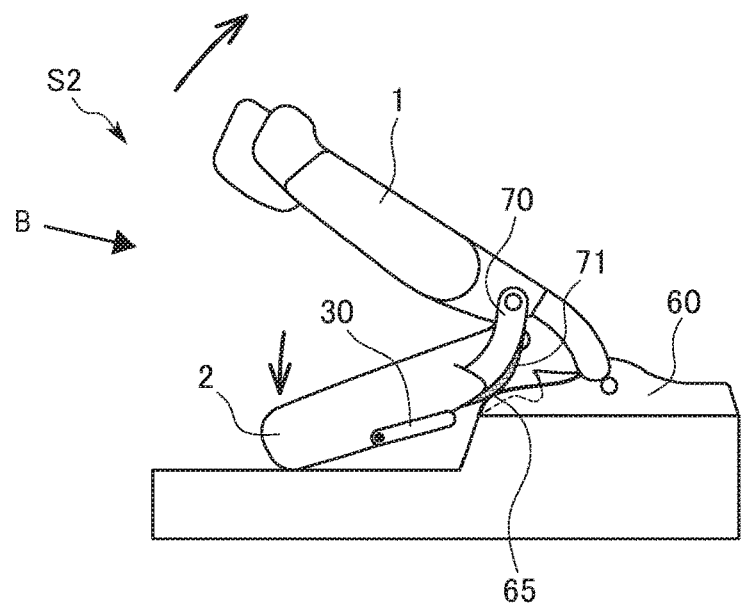

When the vehicle seat S2 has reached a predetermined position shown in FIG. 12B, the cushion contact portion 71 makes contact with the base contact portion 65. The cushion contact portion 71 is brought into contact with the base contact portion 65 in advance; thereby, the detachable leg 30 is guided to pass over the base cover 60 as shown in FIG. 13A.

The detachable leg 30 in moving makes contact with the leg movement restriction portion 64 as shown in FIG. 13B; therefore, the movement of the detachable leg 30 is restricted by the leg movement restriction portion 64 so that the detachable leg 30 moves toward the leg retaining member 50. At this time, the detachable leg 30 is brought into contact with the leg movement restriction portion 64 and is guided to be pulled in a downward direction; thereby, the locked state of the leg pivoting device 28 is automatically released. Then, the detachable leg 30 is fitted again into the leg retaining member 50. According to a series of the above-mentioned operations, the vehicle seat S2 returns to the seatable state shown in FIG. 14.

With the above-mentioned configuration, at the time of moving the seat body B directly from the retracted state to the seatable state, the leg movement restriction part brings the detachable leg 30 moving along with the seat body B into contact with the leg movement restriction portion 64, thereby restricting the rearward movement of the detachable leg 30 and guiding the detachable leg 30 toward the leg retaining member 50.

Other Embodiments

In the above-mentioned embodiments, the retraction floor is disposed in the seat front side of the vehicle seat S as shown in FIG. 8A, but other embodiments are not limited thereto. The retraction floor may be disposed in the rear side of the vehicle seat S. In this case, it is preferable that a positional relation between the seat pivot shaft 12 and the detachable leg 30 in the front to back direction of the seat are reversed relative to each other and that a positional relationship between the detachable leg 30 and the leg movement restriction portion 64 in the front to back direction is reversed relative to each other.

In the above-mentioned embodiments, as shown in FIG. 9C, when the seat body B is in the retracted state, the cushion pivoting device 25 can change to the locked state where the pivotal movement of the seat cushion 2 is locked, but other embodiments are not limited thereto. The cushion pivoting device 25 may be configured to change to the locked state when the seat body B is in the tip-up state shown in FIG. 10B.

In the above-mentioned embodiments, as shown in FIG. 8B, when the seat body B changes from the seatable state to the retracted state, the detachable leg 30 pivots rearward relative to the seat cushion 2 about the leg pivot shaft 28a in the front to back direction of the seat and thereafter is retracted toward the seat cushion 2. However, such configuration of the detachable leg 30 can be changed as appropriate. For example, the detachable leg 30 may be configured to pivot about the leg pivot shaft 28a toward the front side of the seat and thereafter be retracted toward the seat cushion 2. At this time, preferably, the upper end portion of the detachable leg 30 is disposed further rearward in the front to back direction of the seat than the lower end portion of the detachable leg 30 and is inclined rearward extending upward from the lower end portion to the upper end portion. Therefore, the detachable leg 30 more easily pivots toward the seat cushion 2 to be retracted thereto.

In the above-mentioned embodiments, the support base 40 is fixed via the rail devices 4 on the vehicle body floor but other embodiments are not limited thereto. The arrangement of the support base 40 may be changed as appropriate, for example, the support base 40 may be directly fixed on the vehicle body floor without the need for the rail devices 4. Further, in the above-mentioned embodiments, the seat back 1 may be directly connected to the support base 40 via the seat pivot shaft 12 without the need for the connecting bracket 11.

In the above-mentioned embodiments, preferably, one of the base contact portion 65 or the cushion contact portion 71 may be formed to have a friction coefficient lower than a friction coefficient of the other. With such configuration, the base cover 60 and the cushion cover 70 can be inhibited from being scratched or damaged from each other when the base cover 60 and the cushion cover 70 are brought into contact with each other. Additionally, it is preferable that the leg movement restriction portion 64 of the base cover 60 is configured to have a relatively small friction coefficient. With this configuration, the detachable leg 30 and the leg movement restriction portion 64 can be inhibited from being scratched or damaged from each other when the detachable leg 30 and the leg movement restriction portion 64 are brought into contact with each other.

In the foregoing embodiments, a retractable vehicle seat applied to an automobile is explained as an example, but other examples are not limited thereto. At least some of the embodiments of the vehicle seat of the present disclosure can be utilized as a vehicle seat for a train, a bus, or the like, or as a passenger seat for an airplane, a boat, or the like.

The vehicle seats S and S2 are generally described according to various embodiments. The described embodiments are merely examples to facilitate understanding of the present disclosure and do not restrict the invention. The embodiments of the present disclosure may be changed or modified without departing from the invention and may include its equivalents. In particular, for the shapes, arrangements, and configurations of the detachable leg 30, the support base 40, the leg retaining member 50, the base cover 60, and the cushion cover 70 and for the configuration of the leg movement restriction portion 64, the descriptions thereof in the foregoing embodiments are merely examples and do not restrict the invention.

Table of Reference Numerals

S, S2: Vehicle seat
B: Seat body
1: Seat back
    1a, 2a, 3a: Cushion pad
    1b, 2b, 3b: Surface material
2: Seat cushion
3: Headrest
4: Rail device
    4a: Lower rail
    4b: Upper rail
5: Rail lock device
    5a: Rail operating member
10: Back frame
11: Cconnecting bracket
12: Seat pivot shaft
13: Reclining device
14: Spiral spring
15: Anchor member
20: Cushion frame
21: Side frame
    21a: Flange portion
22: Front connecting pipe
23: Center connecting pipe
24: Ppan frame
25: Cushion pivoting device
26: Cushion pivot shaft
27: Spiral spring -continued

| Table of Reference Numerals |
|---|
| 28: Leg pivoting device |
|     28a: Leg pivot shaft |
|     28b: Spring member |
| 30: Detachable leg |
| 31: Leg body portion |
| 32: Leg connecting portion |
| 40: Support base |
| 41: Side base portion |
|     41a: Connecting wall portion |
|     41b: Inner wall portion |
|     41c: Outer wall portion |
|     41d, 41e: Flange portion |
|     41f: Notch |
| 42: First base connecting portion |
| 43: Second base connecting portion |
| 44: Reinforcement base portion |
|     44a: Connecting wall portion |
|     44b: Inner wall portion |
|     44c: Outer wall portion |
|     44d, 44e: Flange portion |
|     44f: Base attachment portion |
|     44g: Protruding portion |
| 45: Retaining member support portion |
|     45a: Folded and bent portion |
| 46: Base jutted portion |
|     46a: Retaining portion |
| 50: Leg retaining member |
| 51: Sside wall portion |
| 52: Bottom wall portion |
| 53: Curled portion |
| 54: Inertia lock device |
| 60: Base cover |
| 61: Front cover portion |
|     61a: Inclined portion |
| 62: Leg retraction recessed portion |
|     62a, 62b: Side wall portion |
|     62c: Bottom wall portion |
| 63: Leg guide portion |
| 64: Leg movement restriction portion |
|     64a: Protruding portion |
|     64b: Contact portion |
| 65: Base contact portion |
| 66: Reinforcement rib |
| 67: Lever contact portion |
| 68: Rear cover portion |
| 69: coupling portion |
| 70: Cushion cover |
| 71: Cushion contact portion |
| 80: Lockoff device |
| 81: Lockoff lever |
| F1: Imaginary plane |
| F2: Contact plane |
| F3: Plane |

What is claimed is:

1. A vehicle seat, comprising:
a seat back and a seat cushion connected to the seat, the seat back and the seat cushion being retractable to a retraction floor of a vehicle body floor;
a support base connected to the vehicle body floor, disposed below the seat cushion, and pivotally connected to a lower end of the seat back so that the lower end of the seat back is pivotable; and
a base cover that covers the support base from above the support base, wherein:
the vehicle seat is configured to be switched between a seatable state and a retracted state:
the base cover comprises a contact portion that contacts the seat cushion when the vehicle seat moves from the seatable state to the retracted state; and
the contact portion of the base cover is separated from the seat cushion when the vehicle seat is in the retracted state.

2. The vehicle seat according to claim 1, wherein:
the vehicle seat further comprises a rail device that includes right and left lower rails and right and left upper rails,
the base cover comprises an inclined portion that is formed at a portion of the base cover that corresponds to an upper side of a front end portion of one of the right and left upper rails, and
the inclined portion has an arc-shape in a seat side view and is inclined upward from a front side to a rear side of the inclined portion.

3. The vehicle seat according to claim 1, wherein:
the base cover comprises a recessed portion that is recessed downward from an upper surface of the base cover.

4. The vehicle seat according to claim 3, wherein:
the recessed portion comprises a pair of side wall portions and a bottom wall portion that connects the pair of side wall portions.

5. The vehicle seat according to claim 3, wherein:
a reinforcement rib is formed on a back surface of the base cover that faces the support base; and
the reinforcement rib is provided around the recessed portion.

6. The vehicle seat according to claim 3, wherein:
the base cover comprises a protruding portion that is formed at a rear of the recessed portion and that protrudes upward.

7. The vehicle seat according to claim 3, wherein:
the base cover comprises a front cover portion and a rear cover portion,
the recessed portion is integrally formed with the front cover portion;
the vehicle seat further comprises a seat pivot shaft about which the seat back is pivotable; and
the base cover is configured to be separable, at a position where the seat pivot shaft is located, in a front and rear direction into the front cover portion and the rear cover portion.

8. A vehicle seat, comprising:
a seat back and a seat cushion connected to the seat, the seat back and the seat cushion being retractable to a retraction floor of a vehicle body floor;
a support base connected to the vehicle body floor, disposed below the seat cushion, and pivotally connected to a lower end of the seat back so that the lower end of the seat back is pivotable;
a base cover that covers the support base from above the support base; and
right and left rail devices that support the seat back and the seat cushion so that the seat back and the seat cushion are movable in a seat front to rear direction, wherein:
the base cover covers at least a part of the right and left rail devices from above the right and left rail devices,
the base cover comprises an inclined portion that is formed on a front side of the base cover; and
the inclined portion has an arc-shape in a seat side view and is inclined upward from a front side to a rear side of the inclined portion.

9. The vehicle seat according to claim 8, wherein:
the base cover comprises a recessed portion, and
the recessed portion comprises a pair of side wall portions and a bottom wall portion that connects the pair of side wall portions.

10. The vehicle seat according to claim 8, wherein:
the base cover comprises a recessed portion that is recessed downward from an upper surface of the base cover,
a reinforcement rib is formed on a back surface of the base cover that faces the support base,
the reinforcement rib is provided around the recessed portion.

11. The vehicle seat according to claim 8, wherein:
the vehicle seat is configured to be switched between a seatable state and a retracted state,
the base cover comprises a contact portion that contacts with the seat cushion when the vehicle seat moves from the seatable state to the retracted state, and
the contact portion of the base cover is separated from the seat cushion when the vehicle seat is in the retracted state.

12. The vehicle seat according to claim 8, wherein:
the base cover comprises a recessed portion, and a protruding portion that is formed at a rear of the recessed portion and that protrudes upward.

13. The vehicle seat according to claim 8, wherein:
the base cover comprises a front cover portion and a rear cover portion,
the vehicle seat further comprises a seat pivot shaft about which the seat back is pivotable, and
the base cover is configured to be separable, at a position where the seat pivot shaft is located, in a front and rear direction into the front cover portion and the rear cover portion.

14. A vehicle seat, comprising:
a seat back and a seat cushion connected to the seat, the seat back and the seat cushion being retractable to a retraction floor of a vehicle body floor;
a support base connected to the vehicle body floor, disposed below the seat cushion, and pivotally connected to a lower end of the seat back so that the lower end of the seat back is pivotable; and
a base cover that covers the support base from above the support base, wherein:
the base cover comprises a front cover portion and a rear cover portion, and
a coupling portion that couples the front cover portion and the rear cover portion is located at a front side of a rear end of the support base;
the base cover comprises an inclined portion; and
the inclined portion has an arc-shape in a seat side view.

15. The vehicle seat according to claim 14, wherein:
the base cover comprises a recessed portion, and
the recessed portion comprises a pair of side wall portions and a bottom wall portion that connects the pair of side wall portions.

16. The vehicle seat according to claim 14, wherein:
the base cover comprises a recessed portion,
a reinforcement rib is formed on a back surface of the base cover that faces the support base, and
the reinforcement rib is provided around the recessed portion.

17. The vehicle seat according to claim 14, wherein:
the vehicle seat is configured to be switched between a seatable state and a retracted state,
the base cover comprises a contact portion that contacts with the seat cushion when the vehicle seat moves from the seatable state to the retracted state, and
the contact portion of the base cover is separated from the seat cushion when the vehicle seat is in the retracted state.

18. The vehicle seat according to claim 14, wherein:
the base cover comprises a recessed portion, and a protruding portion that is formed at a rear of the recessed portion and that protrudes upward.

* * * * *